(12) United States Patent
Ludwig et al.

(10) Patent No.: US 12,345,538 B2
(45) Date of Patent: Jul. 1, 2025

(54) SYSTEM AND METHOD FOR MONITORING A VEHICLE

(71) Applicant: BlackBerry Limited, Waterloo (CA)

(72) Inventors: Sue Hsiu Ying Ludwig, Mississauga (CA); Petar Sic, Mississauga (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 17/461,637

(22) Filed: Aug. 30, 2021

(65) Prior Publication Data
US 2023/0066476 A1    Mar. 2, 2023

(51) Int. Cl.
*G01C 21/34*    (2006.01)
*G01C 21/36*    (2006.01)

(52) U.S. Cl.
CPC ..... *G01C 21/3484* (2013.01); *G01C 21/3602* (2013.01); *G01C 21/3626* (2013.01)

(58) Field of Classification Search
CPC ............ G01C 21/3484; G01C 21/3602; G01C 21/3626
See application file for complete search history.

(56) References Cited

U.S. PATENT DOCUMENTS

| | | | | |
|---|---|---|---|---|
| 2006/0206261 A1* | 9/2006 | Altaf | ................. | G01C 21/3626 340/995.19 |
| 2009/0243932 A1* | 10/2009 | Moshfeghi | ............. | G01C 21/20 342/378 |
| 2010/0070171 A1* | 3/2010 | Barbeau | ............. | G01C 21/3617 701/408 |
| 2011/0231091 A1* | 9/2011 | Gourlay | ........... | G08G 1/096811 701/465 |
| 2016/0225072 A1* | 8/2016 | Brady | .................... | G07C 5/008 |
| 2019/0213272 A1* | 7/2019 | Wong | ................. | G01C 21/3811 |
| 2019/0286793 A1* | 9/2019 | Patton | .................... | G06F 16/29 |
| 2020/0116515 A1* | 4/2020 | Chadha | ............. | G01C 21/3453 |
| 2020/0258324 A1* | 8/2020 | San Miguel | ............ | G01S 19/40 |
| 2020/0309543 A1* | 10/2020 | Voznesensky | ..... | G01C 21/3407 |
| 2022/0245971 A1* | 8/2022 | Howard | ................. | G07C 5/008 |

OTHER PUBLICATIONS

Brodsky., "H3: Uber's Hexagonal Hierarchical Spatial Index," Engineering, Jun. 2018, 11 pages.
Crisgar, et al., "GPS-based Vehicle Tracking and Theft Detection Systems Using Google Cloud IoT Core & Firebase," International Symposium on Electronics and Smart Devices (ISESD), Jun. 29, 2021, pp. 1-6.

(Continued)

*Primary Examiner* — Anne Marie Antonucci
*Assistant Examiner* — Patrick M Brady
(74) *Attorney, Agent, or Firm* — Conley Rose, P.C.; J. Robert Brown, Jr.

(57) ABSTRACT

The present disclosure provides, in an aspect, a computer implemented method for monitoring a current use of a vehicle in real-time based on historical vehicle use, the method including acquiring, for a vehicle, historical vehicle data indicative of prior vehicle use; generating, using the historical vehicle data, a historical baseline characterizing a historical use of the vehicle; assessing a current use of the vehicle based on the historical baseline, and generating an alert based on the assessment.

17 Claims, 17 Drawing Sheets

(56) References Cited

OTHER PUBLICATIONS

International Patent Application No. PCT/US2022/041706, International Search Report and Written Opinion, dated Dec. 5, 2022.
Lin, et al., "A Car Security System Based on Internet +GPS," 2nd International Conference on Artificial Intelligence and Big Data, May 25, 2019, pp. 291-294.
Liu, et al., "A Low-Cost Vehicle Anti-Theft System Using Obsolete Smartphone, "Hindawi, Mobile Information Systems, vol. 2018, Jan. 1, 2018, pp. 1-16.

* cited by examiner

SYSTEM AND METHOD FOR MONITORING A VEHICLE

FIELD

The present disclosure relates generally to monitoring a vehicle, and more particularly to monitoring a vehicle based on historical vehicle data, and even more particularly to monitoring and classifying a vehicle location based on historical vehicle routes.

BACKGROUND

A plethora of multi-sensor systems exist which acquire and express various behaviours exhibited by vehicles. For example, speedometers and accelerometers respectively express vehicle speed and acceleration. Vehicle navigation systems such a Global Positioning System (GPS) and Inertial Navigation System (INS) can characterize vehicle geolocation or relative vehicle location, respectively. Other sensors and systems such as cameras, LiDAR, and RADAR can provide enhancements to vehicles to detect cars, people, or other objects in the vicinity of the vehicle.

It remains desirable however to develop further improvements and advancements in relation to classifying, categorizing, monitoring or assessing vehicles, to overcome shortcomings of known techniques, and to provide additional advantages.

This section is intended to introduce various aspects of the art, which may be associated with the present disclosure. This discussion is believed to assist in providing a framework to facilitate a better understanding of particular aspects of the present disclosure. Accordingly, it should be understood that this section should be read in this light, and not necessarily as admissions of prior art.

BRIEF DESCRIPTION OF THE DRAWINGS

Embodiments of the present disclosure will now be described, by way of example only, with reference to the attached Figures.

Figure 1:
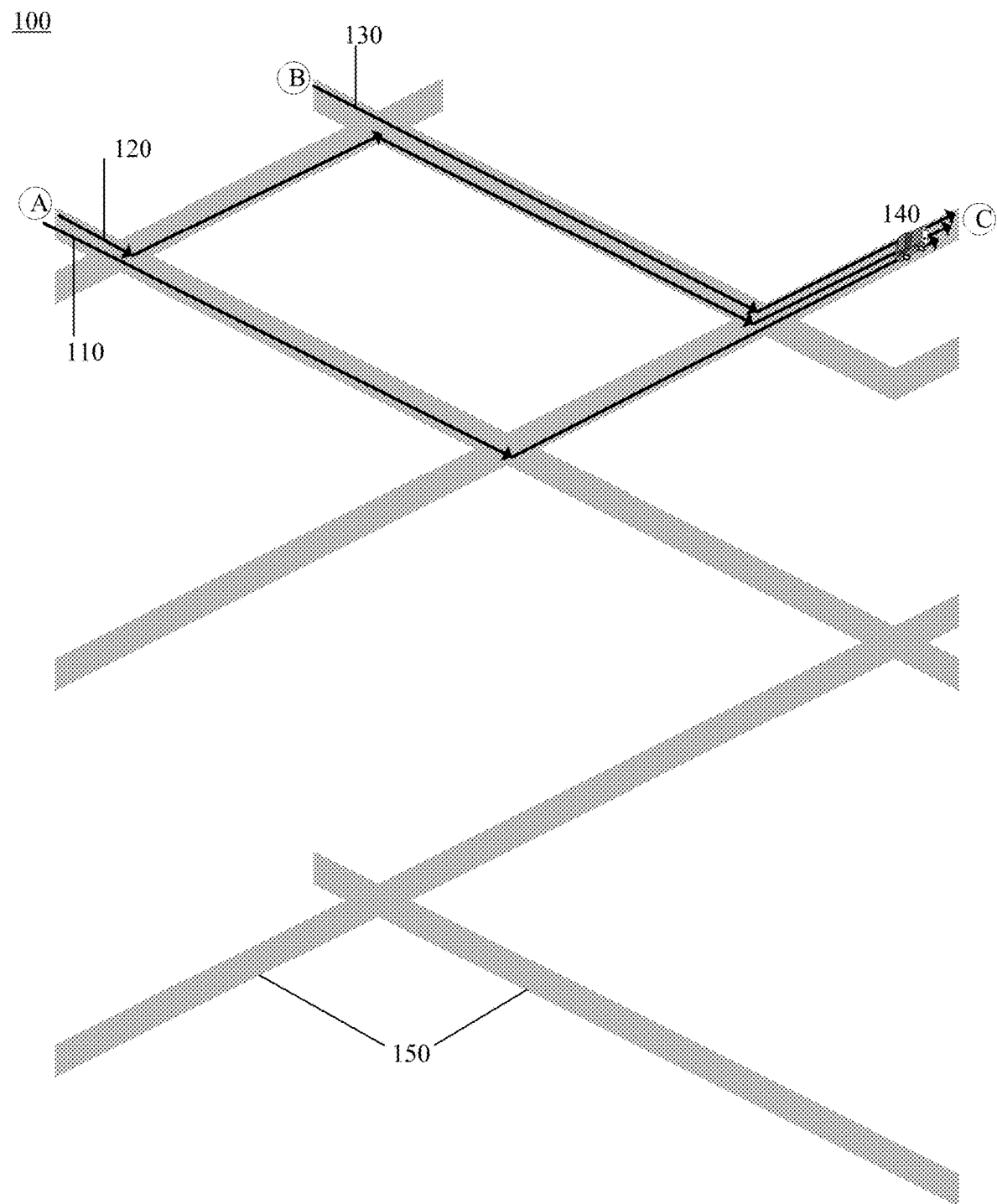
FIG. 1 is a diagram of a road map illustrating three different driving routes taken by a vehicle equipped with a Global Positioning System for acquiring geolocation data of the vehicle.

Throughout the drawings, sometimes only one or fewer than all of the instances of an element visible in the view are designated by a lead line and reference character, for the sake only of simplicity and to avoid clutter. It will be understood, however, that in such cases, in accordance with the corresponding description, that all other instances are likewise designated and encompasses by the corresponding description.

DETAILED DESCRIPTION

The following are examples of systems and methods for classifying a vehicle location in accordance with the present disclosure.

According to an aspect, the present disclosure provides a computer implemented method for monitoring a current use of a vehicle in real-time based on historical vehicle use, the method comprising acquiring, for a vehicle, historical vehicle data indicative of prior vehicle use; generating, using the historical vehicle data, a historical baseline characterizing a historical use of the vehicle; assessing a current use of the vehicle based on the historical baseline, and generating an alert based on the assessment.

According to an example embodiment, the historical baseline comprises a plurality of geolocations previously traversed by the vehicle.

According to an example embodiment, assessing the current use of the vehicle against the historical baseline comprises assessing a current vehicle location against the historical baseline.

According to an example embodiment, assessing the current vehicle location against the historical baseline further comprises assessing the current vehicle location against a threshold criteria.

According to an example embodiment, the threshold criteria is a maximum distance threshold wherein assessing the current vehicle location further comprises assessing the current vehicle location as unknown when a distance between the current vehicle location and the historical baseline exceeds the maximum distance threshold.

According to an example embodiment, the historical baseline comprises corresponding vehicle metadata associated with the plurality of locations previously traversed by the vehicle.

According to an example embodiment, the historical baseline comprises a plurality of data elements, each element associated with a geographic region and being encoded with corresponding geolocations previously traversed by the vehicle.

According to an example embodiment, the plurality of data elements each comprise an indication of traffic density based on a proportion of the corresponding geolocations encoded with the data element.

According to an example embodiment, the geographic regions correspond to a hexagon.

According to an example embodiment, the historical baseline further comprises a bounding region for delineating historical known vehicle locations from historical unknown vehicle locations.

According to an aspect, the present disclosure provides a non-transitory computer-readable medium having instructions stored thereon that, when executed by a computing device, cause the computing device to perform a method comprising acquiring, from a navigation system communicatively coupled to the computing device, a current vehicle location for a vehicle; comparing the current vehicle location to a historical baseline comprising previous locations traversed by the vehicle; determining a current vehicle location status based on the comparison, and issuing an alert if the current vehicle location status is unknown.

According to an example embodiment, the current vehicle location status is unknown if a distance between the current vehicle location and the previous locations traversed by the vehicle exceeds a threshold criteria.

According to an example embodiment, the threshold criteria is a maximum distance between the current vehicle location and a nearest previous location traversed by the vehicle.

According to an example embodiment, the historical baseline further comprises a bounding region for delineating historical known vehicle locations from historical unknown vehicle locations.

According to an aspect, the present disclosure provides a system for monitoring a current use of a vehicle based on historical vehicle use, the system comprising a processor communicatively coupled to a navigation system, for acquiring a current vehicle location for the vehicle; a memory communicatively coupled to the processor and having stored thereon, a historical baseline comprising previous locations traversed by the vehicle, and a display communicatively coupled to the processor and configured to output a current vehicle locations status based on comparing the current vehicle location to the historical baseline.

According to an example embodiment, wherein the processor is configured to update the historical baseline based on the current vehicle location.

According to an example embodiment, the display is configured to display the historical baseline as a plurality of hexagons, each hexagon corresponding to a geographic region encoded with corresponding previous locations traversed by the vehicle.

According to an example embodiment, the previous locations traversed by the vehicle correspond to previous locations traversed by a plurality of vehicles.

The vehicle monitoring systems and methods disclosed herein generally leverage historical driving data and/or driving patterns associated with one or more vehicles and one or more of their respective drivers, to monitor and assess current vehicle behavior. In an example aspect, the systems and methods disclosed herein generate a baseline based on data indicative of historical driving data. For example, the systems and methods disclosed herein may generate a baseline of 'known' locations based on the historical driving routes of the vehicle, for use in classifying, categorizing, monitoring and/or assessing, or otherwise characterizing a current behavior, status, or location of the vehicle. For example, the current vehicle location may be assessed against a baseline of 'known' locations to determine whether the current vehicle location is known, unknown, or another type of status. The determined vehicle location classification may then be leveraged for additional purposes, such as updating the baseline of known locations and/or providing alerts when the vehicle is in an unknown location. Such alerts may be provided directly to the driver, to the vehicle owner on a remote device, to third parties, and so forth. Such alerts may be leveraged to take further action including but not limited to, monitoring the current location of the vehicle, providing routing directions to the nearest known locations, providing a warning to the driver for venturing too far from known locations, providing assistance to the driver, or other corrective action as may be necessary. Furthermore, other vehicle data including but not limited to vehicle speed, vehicle acceleration, cabin temperature, fuel economy, etc., may be assessed against historical metadata for the corresponding vehicle location to otherwise evaluate a current metric against a historical metric for the given location, or evaluate the current metric under a different context including for but not limited to historical values for a time of year, time of day, or day of week.

Generating a baseline of known locations for a vehicle, or fleet of vehicles is based on applying a machine learning algorithm, pattern recognition algorithm, or other statistical modelling technique on data indicative of historical vehicle or driving routes for said vehicle(s). Such historical driving route data can be generated or acquired in a number of ways. For example, a vehicle may be equipped with a vehicle navigation or positioning system, such as a Global Positioning System (GPS), or other systems known in the art, to acquire vehicle location data as a function of time. One example of vehicle location is a geolocation of a vehicle (e.g. latitude and longitude; or, latitude, longitude, and altitude) for a given point in time. Thus, while the vehicle navigation or positioning system is in use, it can generate a plurality of data indicative of the geolocation of the vehicle, which in aggregate, can describe a vehicle or driving route. This process can be repeated across a number of different vehicle trips to generate a plurality of vehicle routes which in aggregate provide a historical record of vehicle or driving routes for the given vehicle(s). For example, geolocation data for a vehicle may be generated over the course of a year to provide historical vehicle route data for that year of driving the vehicle. This process can also be repeated for a fleet of vehicles to generate data indicative of historical vehicle routes for a plurality of vehicles. Embodiments of the present disclosure include dynamically updating data indicative of historical driving routes based on real-time collection of current geolocation or position data of a vehicle while in use. For example, a current vehicle location may be classified as unknown due to the vehicle historically having never travelled to the current vehicle location, or very infrequently having travelled to the current vehicle location. However, as the vehicle traverses to a new or previously unknown area, the baseline may be updated accordingly. In an embodiment, the baseline may be updated using a pattern recognition algorithm or statistical modelling technique to provide an indication that previously unknown locations are now considered known and part of the baseline based on acquiring new geolocation data indicative of the vehicle travelling to new areas and locations, and/or more frequently travelling to previously 'unknown' areas and locations.

Figure 2:
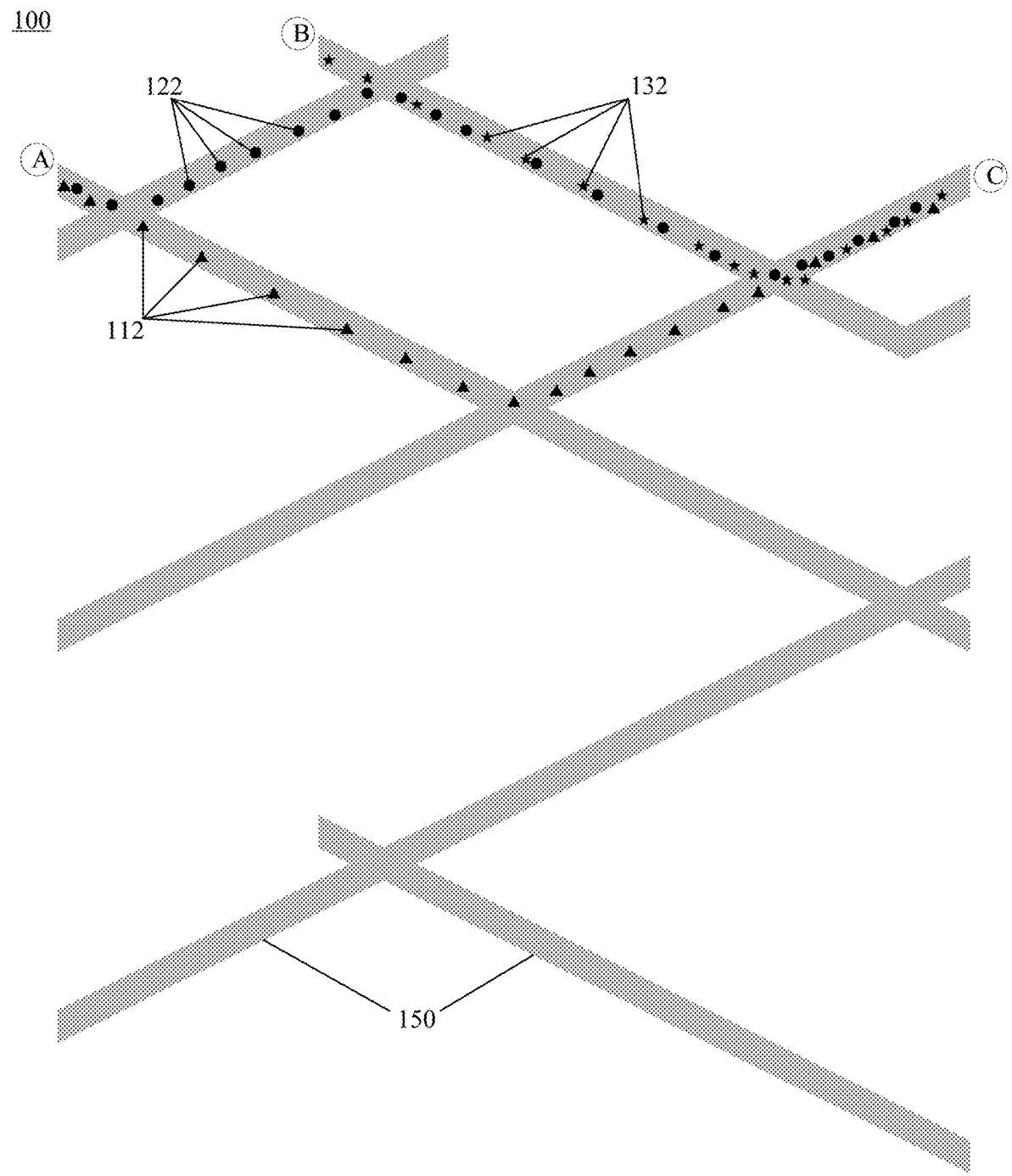
FIG. 2 is the road map of FIG. 1 overlaid with the GPS geolocation data acquired for the three different vehicle routes.

FIGS. 1 and 2 are illustrative examples of acquiring vehicle data for a vehicle 140 equipped with a global positioning system (GPS). FIG. 1 is a diagram of a road map 100 comprising roads 150. A vehicle 140 has taken three separate trips over the roads 150, as indicated by the first route 110, second route 120, and third route 130. The vehicle 140 traversed the first route 110 and the second route 120 beginning at point A and ending at point C. The vehicle traversed the third route 130 beginning at point B and ending at point C. FIG. 2 illustrates the corresponding geolocations acquired by the GPS equipped on the vehicle 140. Specifically, a plurality of first route geolocations 112 marked as triangles illustrates the geolocations acquired by the GPS system while the vehicle 140 traversed the first route 110; a plurality of second route geolocations 122 marked by circles illustrates the geolocations acquired by the GPS system while the vehicle 140 traversed the second route 120; and, a plurality of third route geolocations 132 marked by stars illustrates the geolocations acquired by the GPS system while the vehicle 140 traversed the third route 130.

The vehicle 140 may be equipped with additional sensors and equipment including but not limited to speedometers, accelerometers, cabin sensors such as temperature and air flow sensors, wireless capabilities such as WiFi, charging stations such as through USB connections, entertainment and/or infotainment systems, and fuel level indicators (gas, electric, hybrid, or otherwise) which may generate and provide additional metadata characterizing vehicle behaviour or status, and may be further associated with a corresponding geolocation or position of the vehicle. Historical driving route data for a vehicle may also be subdivided, categorized, or tagged with metadata based on the type-of driver (e.g. parent, friend, child), the particular use of the vehicle (e.g. work route, leisure driving, errand run), the time of the year (e.g. particular month or season) or other category of identifying a particular purpose or use of the vehicle, such as driving on a particular day of the week. The data indicative of historical vehicle or driving routes for a vehicle or fleet of vehicles can be input to a model, such as a machine learning algorithm, pattern recognition algorithm, or statistical model to generate a baseline associated with a location, characteristic, trait, or classification of the vehicle associated with the historical vehicle or driving route data. In other words, a model is used to characterize or aggregate historical behaviour for a vehicle, fleet of vehicles, or their corresponding drivers based on their corresponding historical vehicle data. For example, statistical modelling may be applied to the data indicative of historical vehicle or driving routes for a given vehicle or vehicle fleet to provide insight into the past behaviour of the vehicle(s) and/or their respective drivers. In an embodiment, a statistical model for traffic density is applied to the historical vehicle data for generating a baseline of known locations traversed by the vehicle. In this regard, statistical modelling is applied to the historical vehicle data to generate a baseline which classifies geolocations associated with the historical vehicle or driving routes for a given geographic region as known, unknown, or another status. In an embodiment, the statistical modelling for traffic density is based on how often a vehicle traverses a particular geolocation or area. For example, the traffic density for a given location can be assigned a value based on the number of times a vehicle(s) traverse a particular geolocation or area versus the total number of trips taken by the vehicle(s). The size of the given geographic area may be based on a desired granularity of analysis. For example, traffic density may be assessed for an area the size of a city block, or for larger or smaller areas depending on the desired granularity of analysis. Furthermore, the historical data may be updated in real-time as vehicle geolocation data is acquired during vehicle use. In such a real-time scenario, the statistical model for traffic density may be applied to live data to generate a baseline more responsive to the vehicle's current location and/or most recent locations.

The traffic density values for each geolocation and/or area can be further analyzed to determine whether a given location is 'known' due to the relatively higher frequency of vehicle traversal, versus 'unknown' when there are relatively fewer or no vehicle traversals for the corresponding geolocation or area. In an embodiment, the statistical model generates traffic density values for a given geolocation or area normalized to a value between 0 and 1, wherein 0 represents no traffic density, and 1 represents the highest traffic density for a geolocation or area observed by the historical vehicle data. In an embodiment, a 'known' location corresponds to a traffic density value that exceeds a minimum threshold value. A baseline may be generated for a single vehicle or fleet of vehicles and may also be generated based on different aspects or subsets of the historical data, such as a baseline of known vehicle locations generated for a particular driver or type of driver, for particular use of the vehicle, or for other behaviour, characteristic or metadata associated with the historical vehicle or driving route data.

Figure 3:
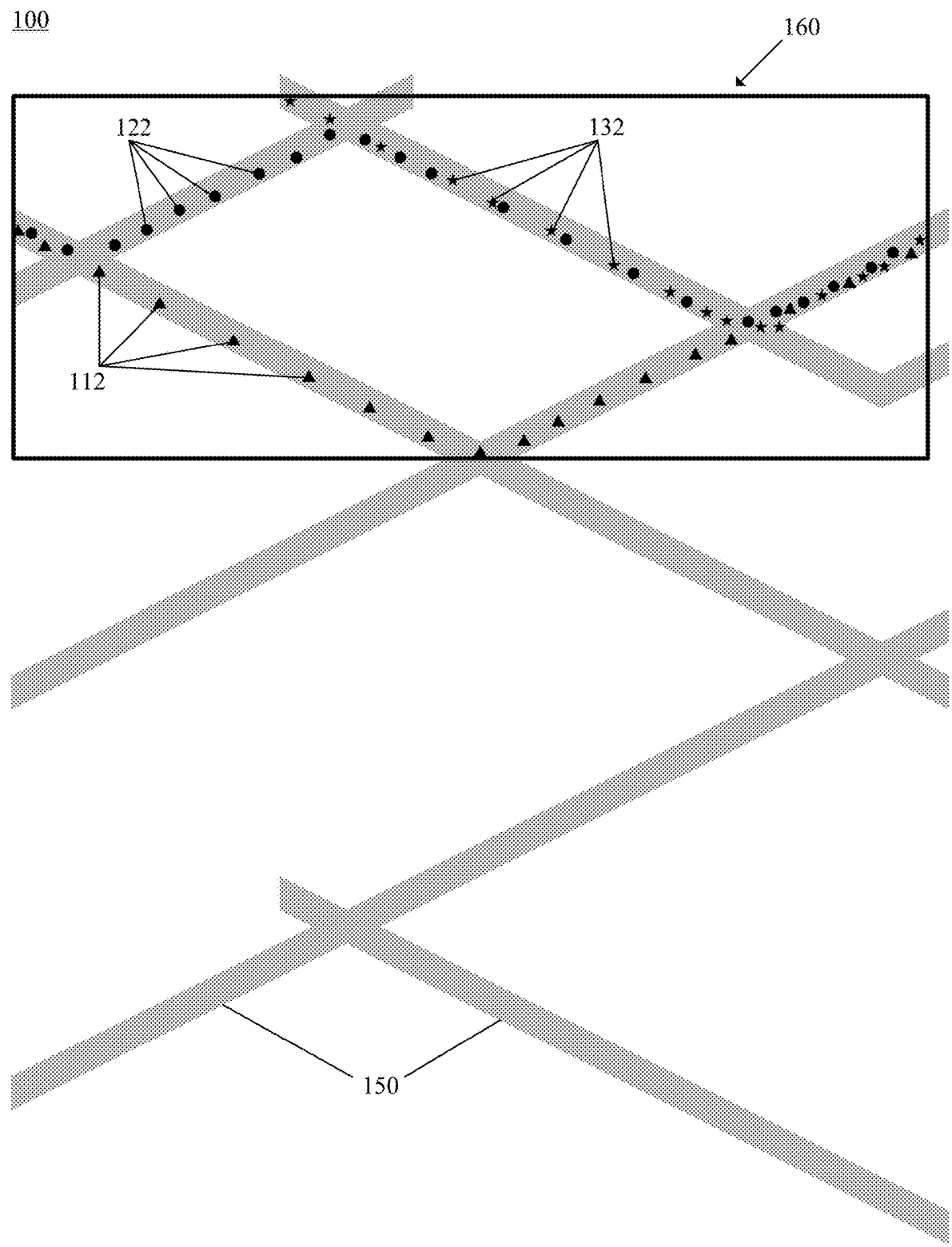
FIG. 3 is a diagram of FIG. 2 further including a rectangular bounding region for delineating known locations from unknown locations.

FIG. 3 illustrates an embodiment of a baseline of known locations generated in accordance with the present disclosure wherein the baseline is defined by a bounding region 160. As illustrated in FIG. 3, the bounding region 160 is a rectangular area that bounds all the geolocations 112, 122, and 132 illustrated in FIG. 2 Accordingly, an interior of the bounding region 160 provides a baseline of known locations traversed by the vehicle 140, further delineated from areas exterior to the bounding region 160 which are unknown or otherwise unclassified. However, in accordance with the present disclosure, the bounding region is not limited to a particular shape. For example, the bounding region may be but is not limited to, a polygon, such as a hexagon, different type of quadrilateral, or other shape; may comprise a plurality of sub-regions; and/or may have a more organically defined shape that mirrors roads, highways, and other driving infrastructure, while similarly excluding non-driving areas such as mountains, rivers, or other geographic features which may be difficult or impossible to traverse in a vehicle. In an embodiment, the bounding region is based on a maximum and a minimum, longitude and latitude, determined from the underlying historical vehicle data.

Figure 4:
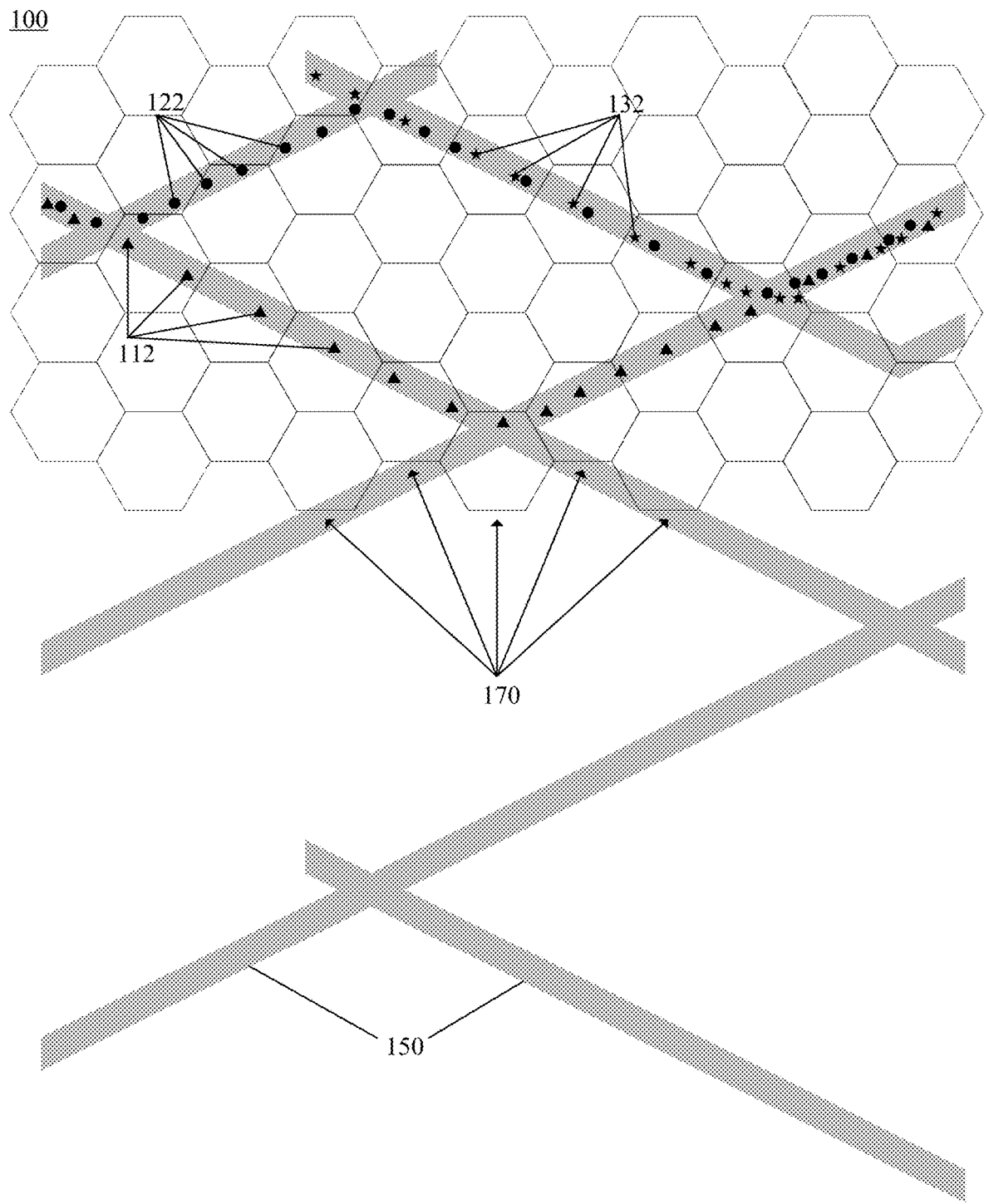
FIG. 4 is a diagram of FIG. 2 further including a plurality of hexagons for defining a baseline and bounding region delineating known locations from unknown locations.

FIG. 4 illustrates an embodiment of a baseline of known locations generated in accordance with the present disclosure wherein the baseline is defined by a bounding region comprising a plurality of hexagons 170. As illustrated in FIG. 4, the plurality of hexagons 170 collectively encompass all the geolocations 112, 122, and 132 illustrated in FIG. 2. Similar to the rectangular bounding region 160 illustrated in FIG. 3, the plurality of hexagons collectively form a rectangular shape based on a maximum latitude, minimum latitude, maximum longitude, and minimum longitude of the plurality of geolocations 112, 122, and 132. Accordingly, each of the plurality of hexagons 170 encompasses none, one, or a plurality of the geolocations 112, 122, and/or 132. Collectively however, the plurality of hexagons 170 provides a baseline of all known locations traversed by the vehicle 140 delineated from areas exterior to the plurality of hexagons 170 which are unknown or otherwise unclassified.

Figure 5:
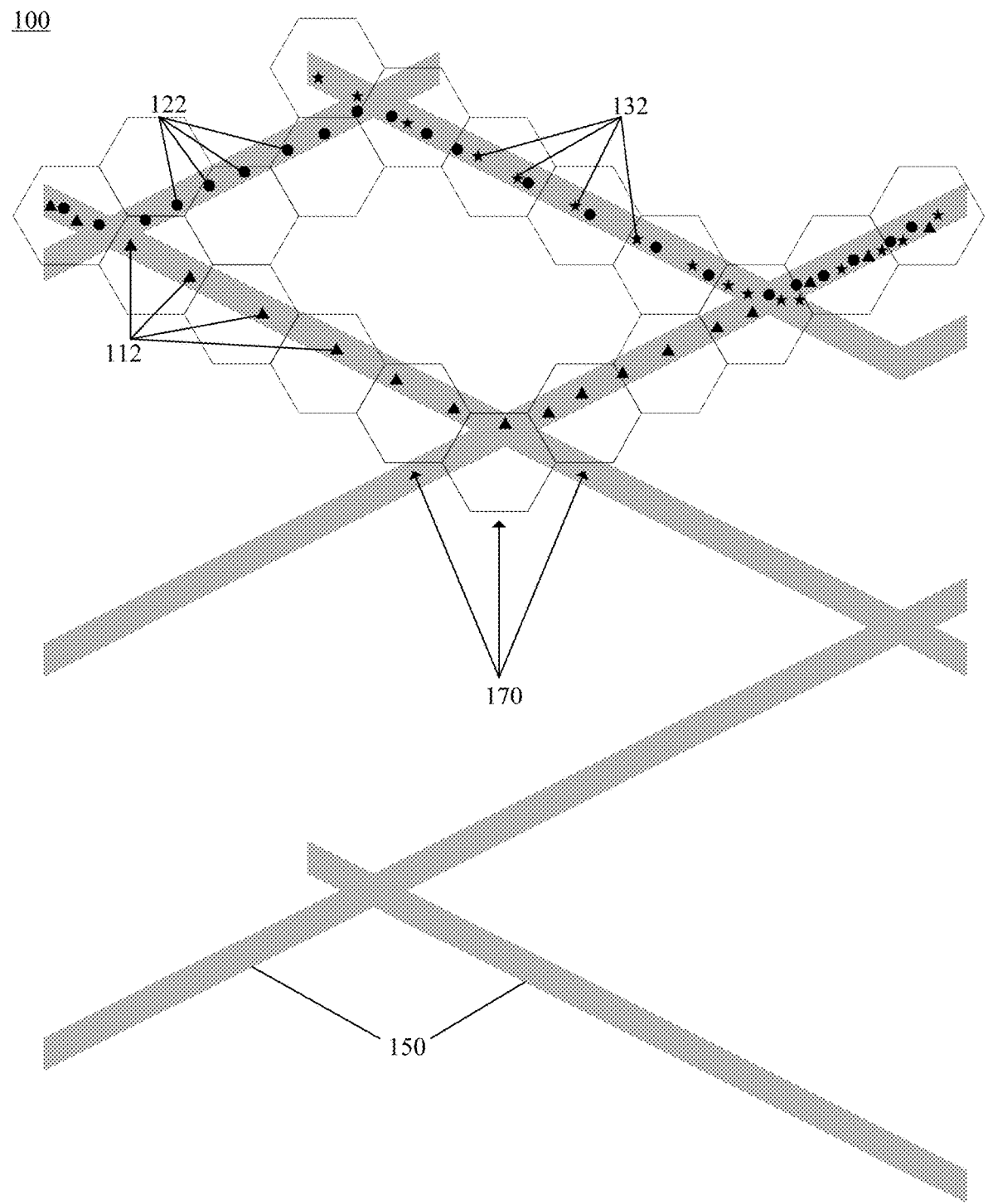
FIG. 5 is a diagram of FIG. 2 further including a plurality of hexagons for defining a baseline comprising only known locations.
Figure 6:
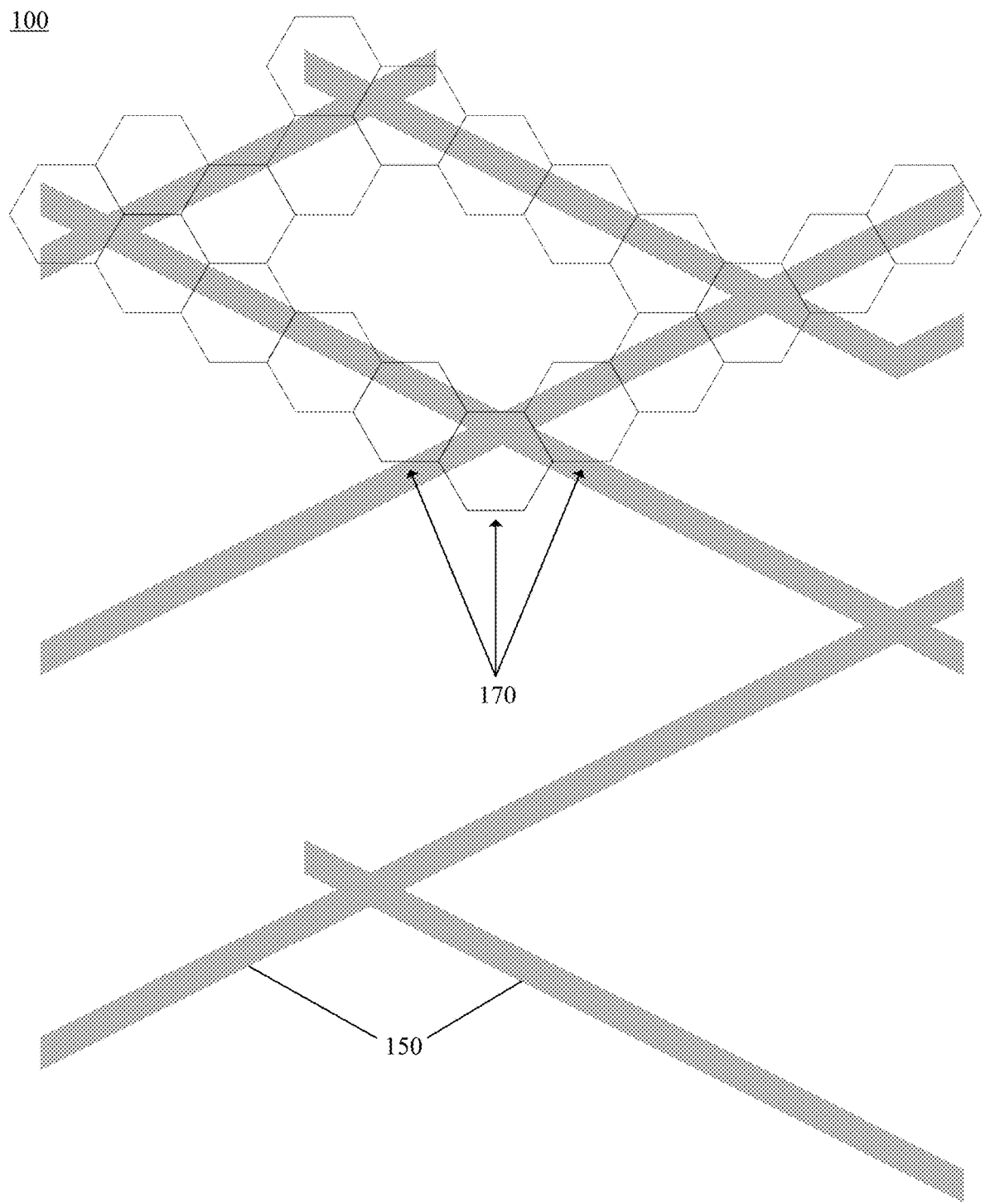
FIG. 6 is the diagram of FIG. 5 wherein the geolocations are removed from the illustration to depict only the baseline overlaid on the road map.

FIG. 5 illustrates an embodiment of a baseline of know locations generated in accordance with the present disclosure wherein the baseline is defined by a bounding region comprising a plurality of hexagons 170, wherein each hexagon includes at least one geolocation 112, 122, and/or 132. Accordingly, the more irregularly shaped baseline of hexagons 170 depicted in FIG. 5 closely mirrors the roads 150 and more accurately delineates regions traversed by the vehicle 140 from areas not traversed by the vehicle 140. FIG. 6 further illustrates the baseline of hexagons 170 depicted in FIG. 5 but having removed the corresponding geolocations.

Figure 7:
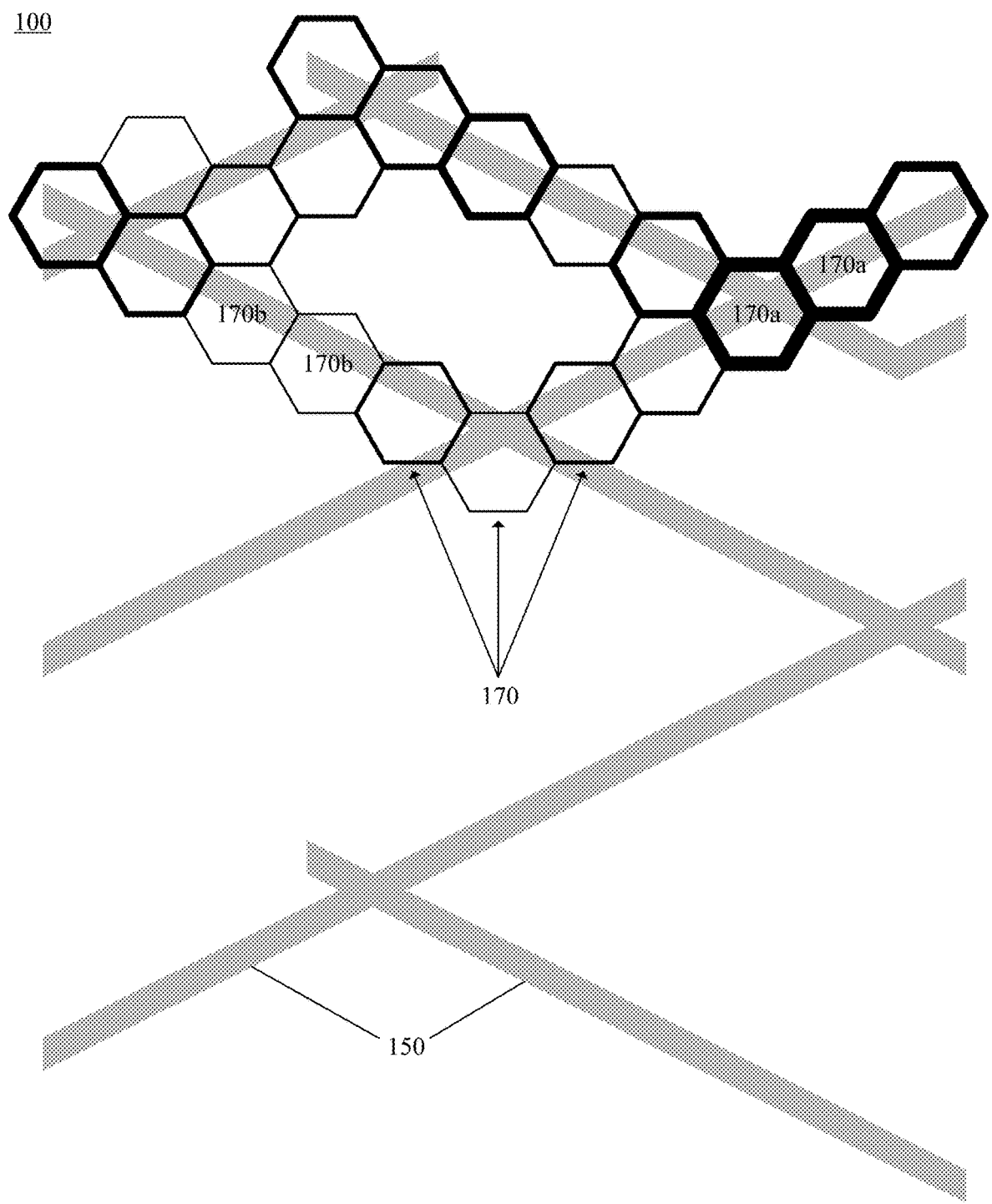
FIG. 7 is the diagram of FIG. 6 wherein the hexagons have modified line thicknesses based on the number of geolocations corresponding to their respective locations.

In an embodiment, a characteristic of an element used to depict or illustrate the baseline may be modified based on the underlying historical vehicle data or metadata associated with the corresponding geolocation(s). For example, an element such as a line, dot, hexagon, or other shape used to illustrate the baseline may be enhanced, such as with a darker color or shade, and/or with thicker lines to provide an indication of the underlying historical data or a degree of the metadata associated with the corresponding geolocation relative to other geolocations. For example, a hexagon having darker and/or thicker lines may indicate geolocations associated with the particular hexagon have more frequent travel or traffic density relative to other hexagons in the baseline and/or may indicate that the hexagon includes relatively more geolocations associated within the area represented by the hexagon that have been traversed by one or more vehicles associated with the underlying historical vehicle data. For example, FIG. 7 illustrates an embodiment of a baseline of know locations generated in accordance with the present disclosure wherein the baseline is defined by a bounding region comprising a plurality of hexagons 170, wherein each hexagon includes at least one geolocation 112, 122, and/or 132, as illustrated the same in FIG. 6. However, the hexagons 170 of FIG. 7 are further modified with thicker lines to provide an indication of traffic density whereby thicker lines provide an indication that a particular hexagon includes a higher number of geolocations 112, 122, and/or 132. For example, the lines for hexagons 170a are thicker than the lines of hexagons 170b, thereby providing an indication of the greater number of geolocations 112, 122, and/or 132 found at hexagons 170a relative to 170b.

In an embodiment, each element of the baseline may be encoded with one or more geolocations of known locations including being encoded with metadata associated with the corresponding one or more geolocations. In an embodiment, a characteristic of an element of a baseline may be enhanced to provide an indication of higher vehicle travel speeds, and/or higher vehicle accelerations associated with the corresponding geolocation. In an embodiment, the element used to depict or illustrate the baseline is a hexagon. In an embodiment, a size of the element used to depict or illustrate the baseline is modified to achieve a desired granularity or accuracy of data. For example, smaller hexagons will necessarily represent smaller geographic areas than comparatively larger hexagons. Consequently, the baseline will comprise a greater number of smaller hexagons and thus higher granularity of data, advantageously providing more precise insights for a given area relative to comparatively larger hexagons which would necessarily include geolocations dispersed over a larger area.

In accordance with the present disclosure, current vehicle locations, status, or other characteristics and/or behaviour of the vehicle(s)/driver(s) may be assessed against the baseline to provide insights on the current vehicle location, driving pattern, or other behaviour exhibited by the vehicle and/or driver. For example, a current vehicle location may be assessed against a baseline of know locations, generated from historical vehicle data, to determine whether the current vehicle location is in a known location or an unknown location. Assessing whether a current vehicle location is known or unknown can provide invaluable insight into the current vehicle driving pattern. For example, when a vehicle is in an unknown location it may provide an indication that the driver is lost, is going the wrong way, needs assistance, requires directions to return to a known location, has taken a less desirable route (e.g. slower, longer, more fuel consumption), has deviated into an area they should avoid, has deviated into an area they are not permitted to enter, that the vehicle has been stolen, and so forth. Assessing whether a current vehicle location is known or unknown relative to the baseline can be accomplished in a number of ways.

Figure 8A:
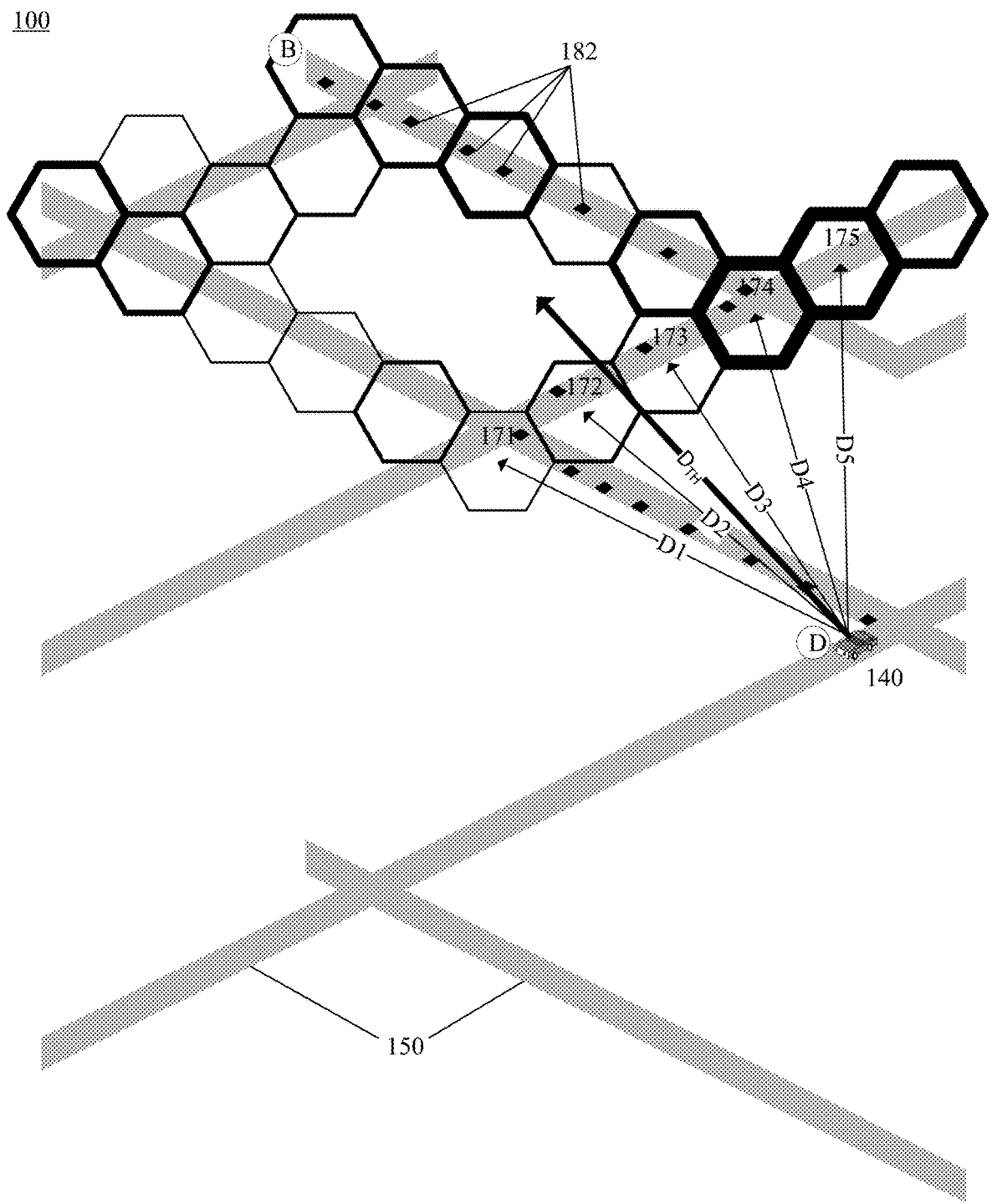
FIG. 8A is a diagram illustrating a location assessment for a vehicle located at a first position outside the bounding region depicted in FIG. 7.

FIGS. 8-10 illustrate examples of determining and displaying a current vehicle location in accordance with the present disclosure. FIG. 8A depicts a baseline of hexagons 170 as illustrated the same in FIG. 7, further including a vehicle 140 having travelled from position B via a plurality of geolocations 182, to position D, outside the baseline of known locations. The assessment of the vehicle's current location at position D is based on comparing a distance of the vehicle 140 from nearby hexagons. In particular, the distances D1, D2, D3, D4, and D5, representing the distance between the vehicle 140 and the center of respective hexagons 171, 172, 173, 174, 175 is assessed against a threshold distance $D_{TH}$. In this instance, the distances between the vehicle 140 to each of the five hexagons 171, 172, 173, 174, 175 is within the threshold distance $D_{TH}$ and thus the present position D constitutes a known location. However whether the current location constitutes a known location relative to a baseline can be based on numerous criteria, including but not limited to: the total number of hexagons within a threshold distance of the vehicle, the distance from the vehicle to the nearest hexagon, and/or the average distance from the vehicle to all hexagons in the baseline. Furthermore, hexagons can be weighted based on underlying characteristic. For example, a hexagon having higher traffic density, such as hexagons 174 and 175, may factor more heavily in determining whether a current location is known or not.

Figure 8B:
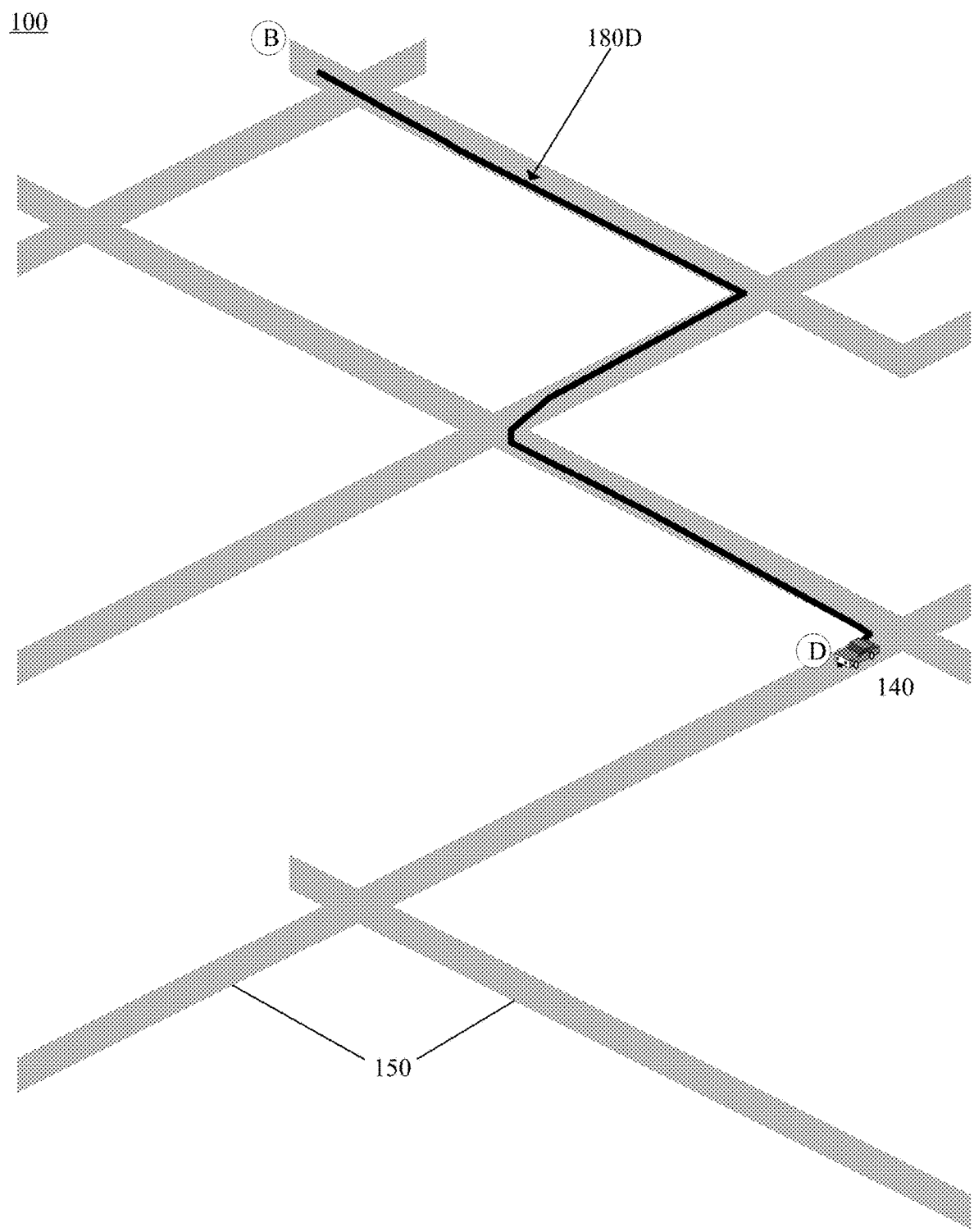
FIG. 8B is a diagram illustrating an embodiment for displaying a path of known locations based on a distance threshold criteria for a vehicle travelling to the first position illustrated in FIG. 8A.

FIG. 8B depicts an embodiment of a path 180D in accordance with the present disclosure. The path 180D comprises line segments illustrating the path of vehicle 140 along the plurality of geolocations 182 from position B to position D. In particular, FIG. 8B illustrates a path 180D comprising solid line segments indicating the path travelled comprises only known locations. In an embodiment, an illustrative path, such as the path 180D may be presented for example, on a display associated with the vehicle, remotely via an electronic communication such as an e-mail or text message, via a software application such as a dashboard app, or provided to another device such as a tablet, computer, remote server/database, and so forth. Properties of the line segments or other visual element used to illustrate a path, such as path 180D, may be modified to illustrate aspects of the underlying data. For example, a line thickness, color, or other property of the line segment may be varied to provide an indication of speed, acceleration, fuel economy, traffic density, whether the associated geolocations are known or unknown, or other properties of metadata and/or historical metadata in accordance with the disclosure.

Figure 8C:
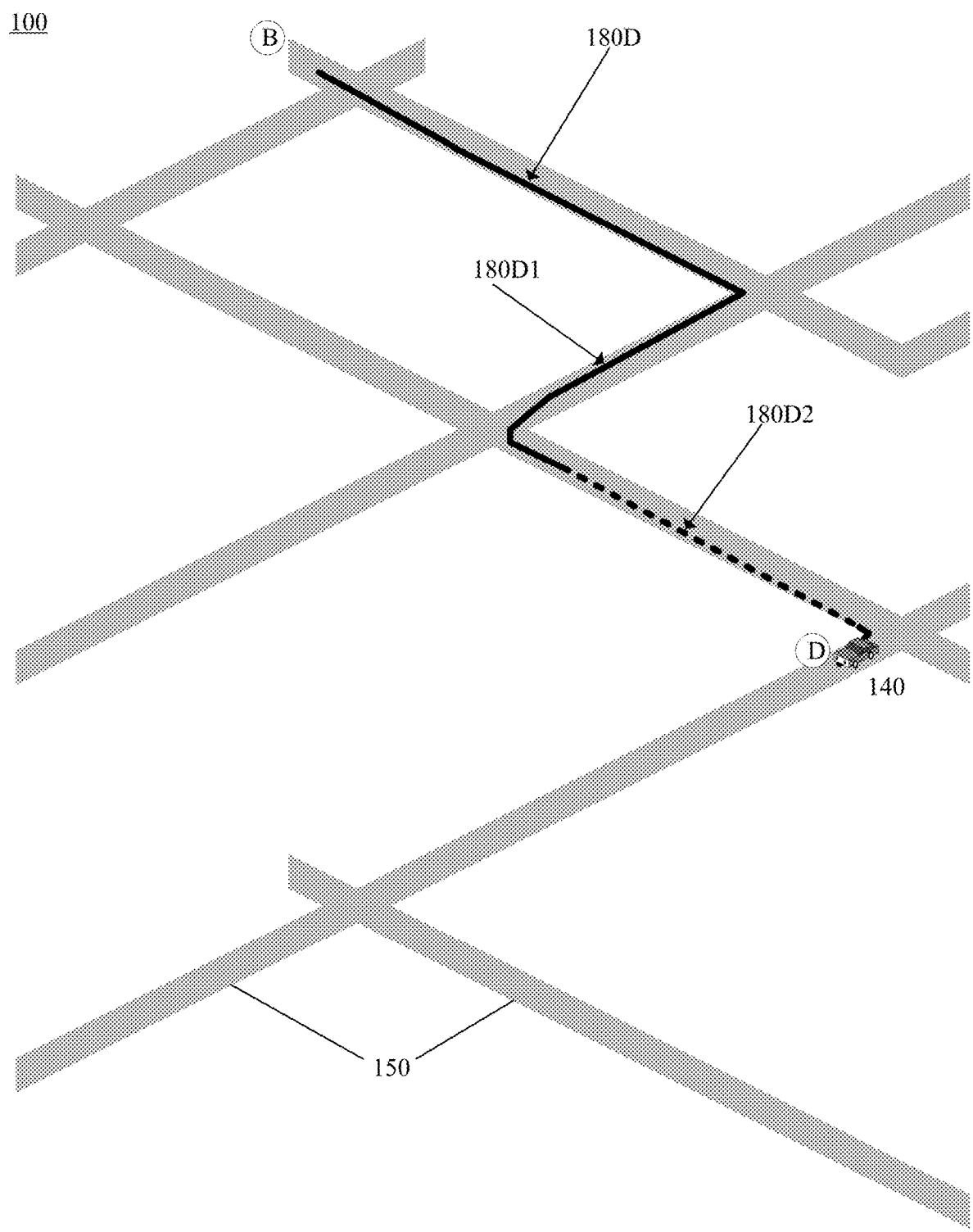
FIG. 8C is a diagram illustrating an embodiment for displaying a path of know and unknown locations based on a bounded region criteria for a vehicle travelling to the first position illustrated in FIG. 8A.

FIG. 8C depicts another embodiment of illustrating a path 180D based on threshold criteria in accordance with the present disclosure. In this embodiment, a determination of whether position D is known or unknown is based on whether position D is within the baseline of hexagons 170. As illustrated in FIG. 8A, position D is located outside the baseline of hexagons 170 indicative of known locations. Consequently in this embodiment, geolocations outside the baseline of hexagons 170, such as position D, are considered unknown. Accordingly, FIG. 8C differs from FIG. 8B in that, the path 180D comprises first segments 180D1 illustrated as solid line segments indicative of a vehicle path which traversed known geolocations within the baseline, and second segments 180D2 illustrated as dashed line segments indicative of a vehicle path which traversed unknown geolocations outside the baseline.

Figure 9A:
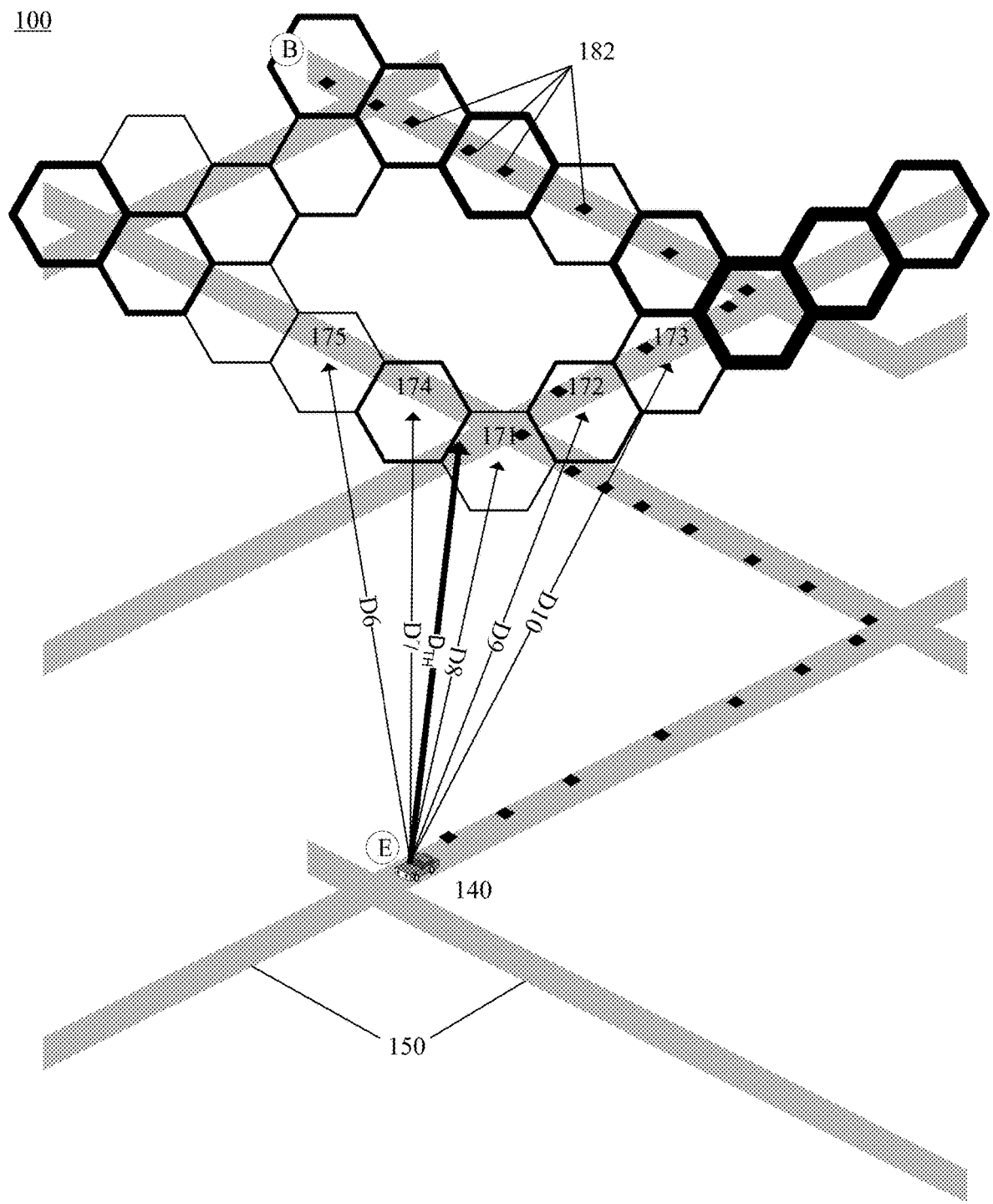
FIG. 9A is a diagram illustrating a location assessment for a vehicle located at a second position outside the bounding region depicted in FIG. 7.

FIG. 9A depicts a baseline of hexagons 170 as illustrated the same in FIGS. 7 and 8A, further including a vehicle 140 having travelled from position B via a plurality of geolocations 182, to position E, outside the baseline of known locations. The assessment of the vehicle's current location at position E is based on comparing a distance of the vehicle 140 from nearby hexagons. In particular, the distances D6, D7, D8, D9, and D10, representing the distance between the vehicle 140 and the center of respective hexagons 175, 174, 171, 172, 173 is assessed against a threshold distance $D_{TH}$. In this instance, the distances between the vehicle 140 to each of the five hexagons 175, 174, 171, 172, 173 are not all within the threshold distance $D_{TH}$ and thus the present position E may not constitute a known location, depending on the criteria. For example, if the criteria requires the vehicle 140 to be within a threshold distance $D_{TH}$ of at least one nearby known location, position E constitutes a known location. However, if the criteria requires the vehicle 140 to be within a threshold distance $D_{TH}$ of at least five nearby known locations, position E constitutes an unknown location.

Figure 9B:
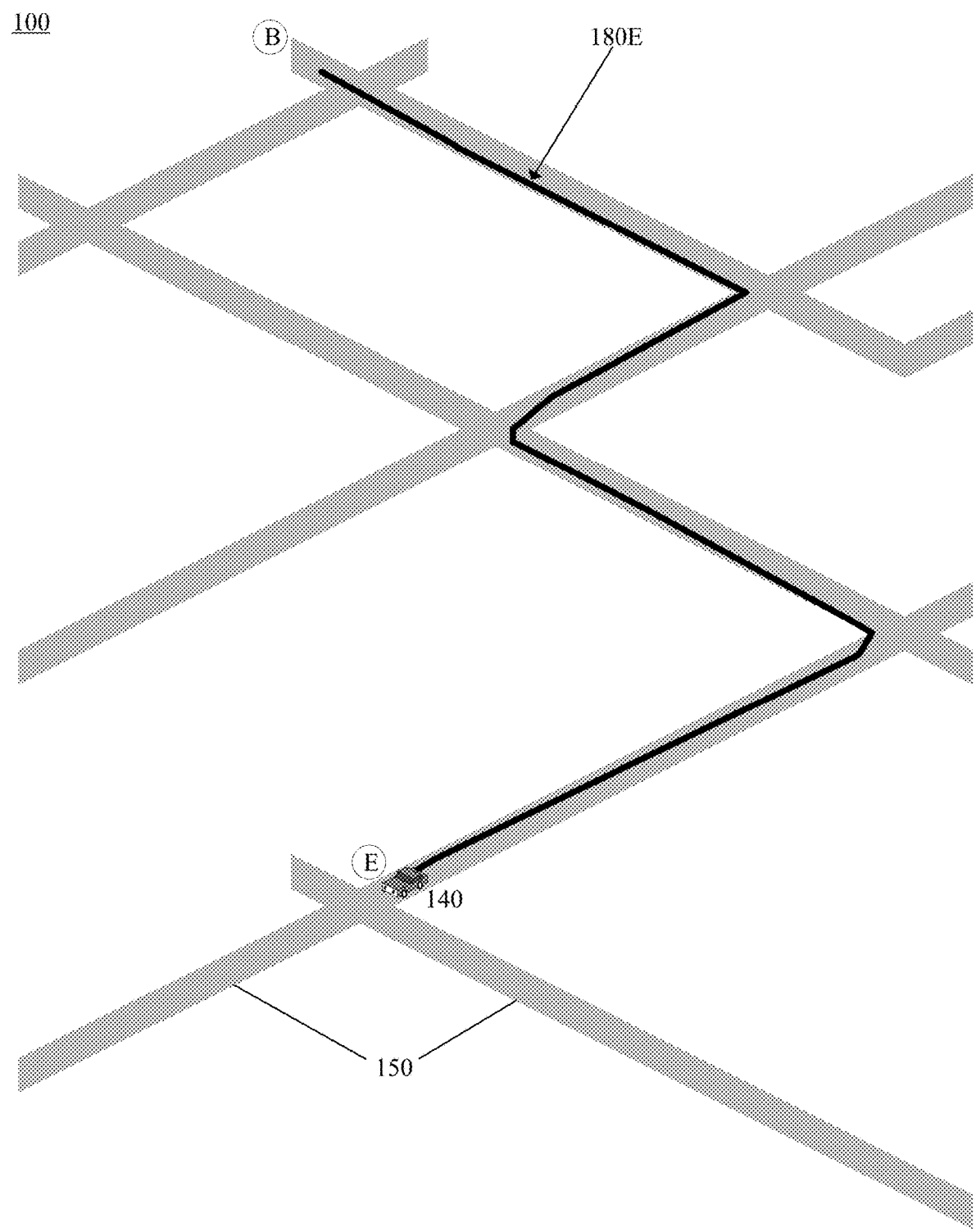
FIG. 9B is a diagram illustrating an embodiment for displaying a path of known locations based on a distance threshold criteria for a vehicle travelling to the second position illustrated in FIG. 9A.

FIG. 9B depicts an embodiment of a path 180E in accordance with the present disclosure. The path 180E comprises line segments illustrating the path of the vehicle 140 along the plurality of geolocations 182 from position B to position E. In particular, FIG. 9B illustrates a path 180E comprising solid line segments indicating the path travelled comprises only known locations in accordance with an associated threshold criteria, such as whether or not the current position E (including associated geolocations leading up to position E) is within a threshold distance $D_{TH}$ of a known location.

Figure 10A:
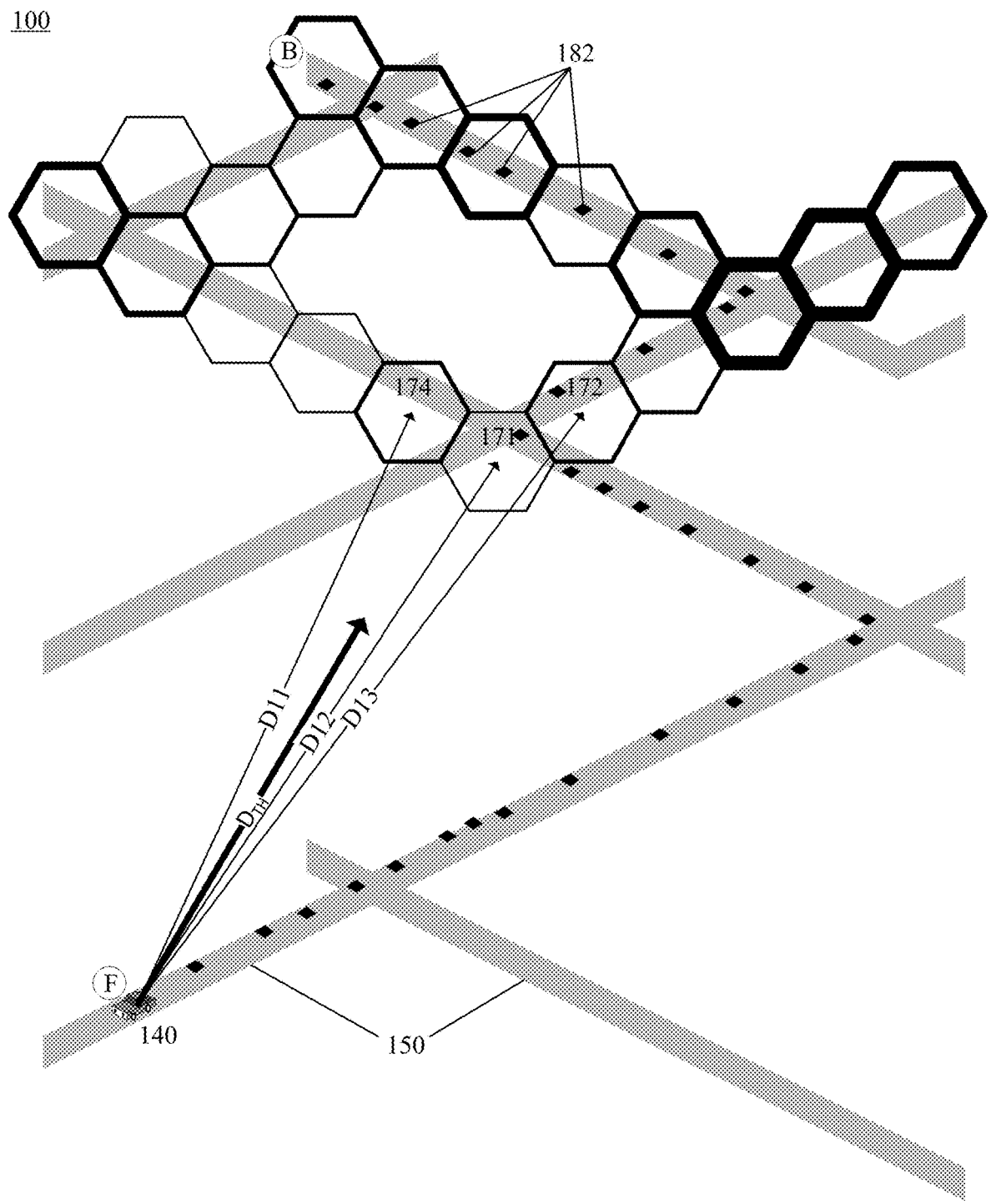
FIG. 10A is a diagram illustrating a location assessment for a vehicle located at a third position outside the bounding region depicted in FIG. 7.

FIG. 10A depicts a baseline of hexagons 170 as illustrated the same in FIGS. 7, 8A, and 9A, further including a vehicle 140 having travelled from position B via a plurality of geolocations 182, to position F, outside the baseline of known locations. The assessment of the vehicle's current location at position F is based on comparing a distance of the vehicle 140 from nearby hexagons. In particular, the distances D11, D12, and D13 representing the distance between the vehicle 140 and the center of the nearest three respective hexagons 174, 171, 172 is assessed against a threshold distance $D_{TH}$. In this instance, the distances between the vehicle 140 to each of the three nearest hexagons 174, 171, 172 are all greater than the threshold distance $D_{TH}$ and thus the present position F constitutes an unknown location, as it is too far from any known locations encompassed by the baseline of hexagons 170.

Figure 10B:
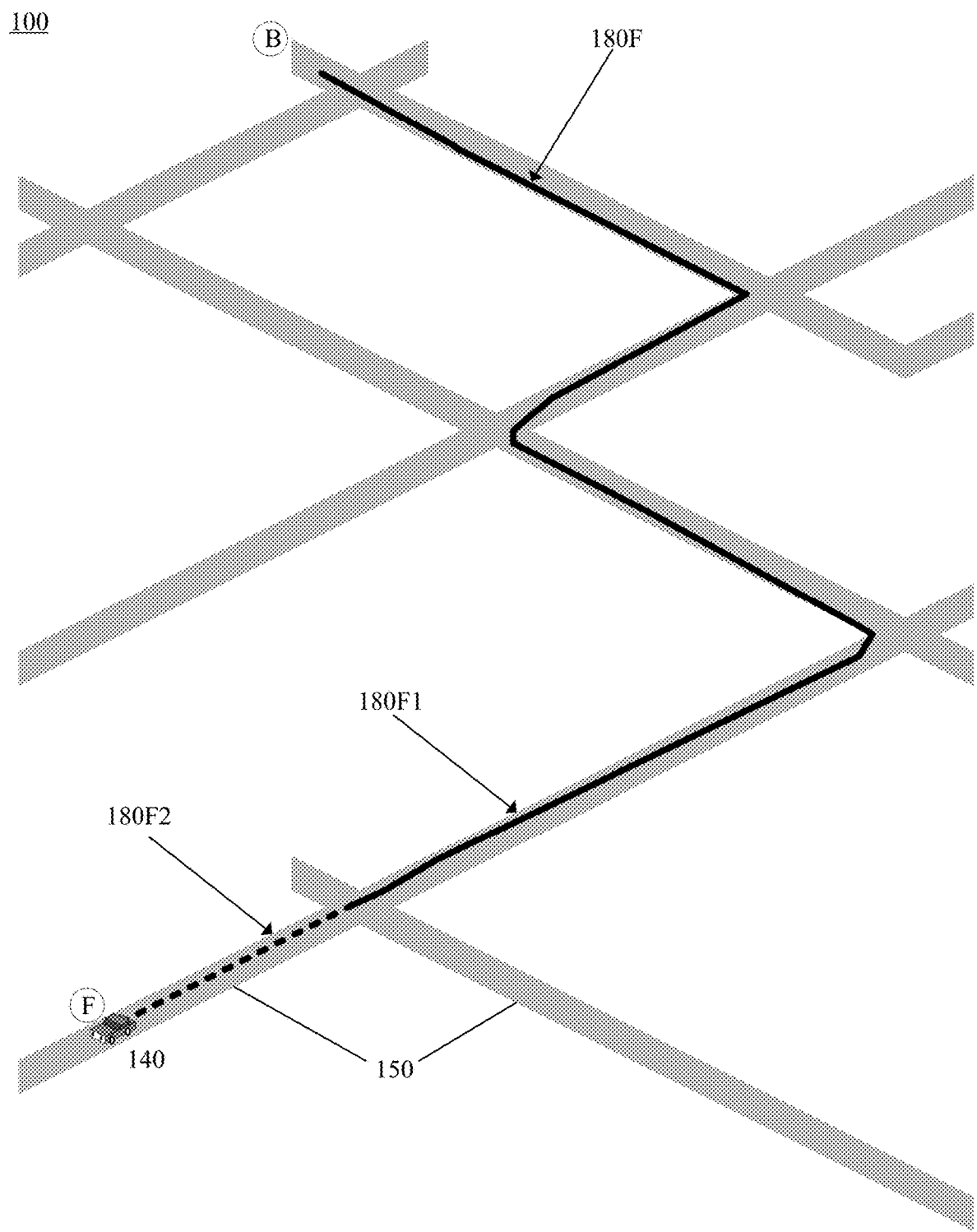
FIG. 10B is a diagram illustrating an embodiment for displaying a path of known and unknown locations based on a distance threshold criteria for a vehicle travelling to the third position illustrated in FIG. 10A.

FIG. 10B depicts an embodiment of a path 180F in accordance with the present disclosure. The path 180F comprises line segments illustrating the path of the vehicle 140 along the plurality of geolocations 182 from position B to position F. In particular, FIG. 10B illustrates that the path 180F comprises first segments 180F1 illustrated as solid line segments indicative of a vehicle path which traversed known geolocations within a threshold distance $D_{TH}$ of the baseline; and, second segments 180F2 illustrated as dashed line segments indicative of a vehicle path which traversed unknown geolocations beyond the threshold distance $D_{TH}$ to the baseline.

In an embodiment, a current vehicle location is unknown when exceeding a minimum distance from the closest known location. In an embodiment, the minimum distance is at least 500 meters. In an embodiment, a current vehicle location is unknown when located in a hexagon of a baseline having traffic density value below a minimum threshold. In an embodiment, a current vehicle location is unknown when it is further than a minimum radial distance from the baseline geolocation or hexagon having the highest traffic density. In an embodiment, a current vehicle location is unknown if it is not located within the border of a bounding region. The current vehicle location or other characteristics of the vehicle's behavior may also be assessed against metadata associated with the corresponding geolocation in the baseline, such as being assessed against metadata for speed, acceleration, or fuel levels associated with the baseline geolocation.

In accordance with the present disclosure, embodiments of a system and method for monitoring a vehicle may take subsequent steps in response to identifying a vehicle in an unknown location or in response to analyzing a current state of the vehicle (e.g. speed, temperature, fuel economy, etc.) against historical metadata for current or nearby known locations. For example, the systems and methods disclosed herein include providing real-time alerts indicative of a vehicle currently located in an unknown location. Such alerts may be issued to the driver, a remote user, or third party and may be represented visually, textually, or audibly, for example as represented on a display or speaker system associated with the vehicle, via an electronic communication such as e-mail, text message, or voicemail message, via a software application such as a dashboard app, or provided to another device such as a tablet, computer, remote server/database, and so forth. Advantageously, the alerts may be adaptable or dynamic as the historical vehicle data and baseline generated therefrom may also change dynamically based on the current location, and thereby modify the baseline of known locations, or other driving behavior being modelled. Accordingly, such dynamic alerts provide a real-time advantage over static alerts that may have otherwise have to be pre-defined or set by a user in advance. Example use cases of alerts include but are not limited to, monitoring whether a particular driver, such as a teenager, student driver, or new driver, traverses the vehicle to unknown or restricted locations, such as may be the case for early-stage drivers whom may be restricted from driving on highways;

monitoring whether the vehicle exceeds speed limits associated with the metadata of known locations; monitoring whether traffic is slow based on historical speed limits associated with the metadata of the known locations; determining whether the current driver has any associated restrictions (such as number of passengers) and acquiring data from a corresponding sensor in the vehicle to assess accordingly; monitoring a temperature of the car relative to historical temperatures associated with the metadata of the known locations; monitoring a fuel economy of the car relative to historical fuel economy associated with the metadata of the known locations; and, monitoring whether delivery vehicles in a fleet of delivery vehicles are sticking to particular routes, such as routes designed to optimize delivery times and/or minimize gas usage.

Figure 11:
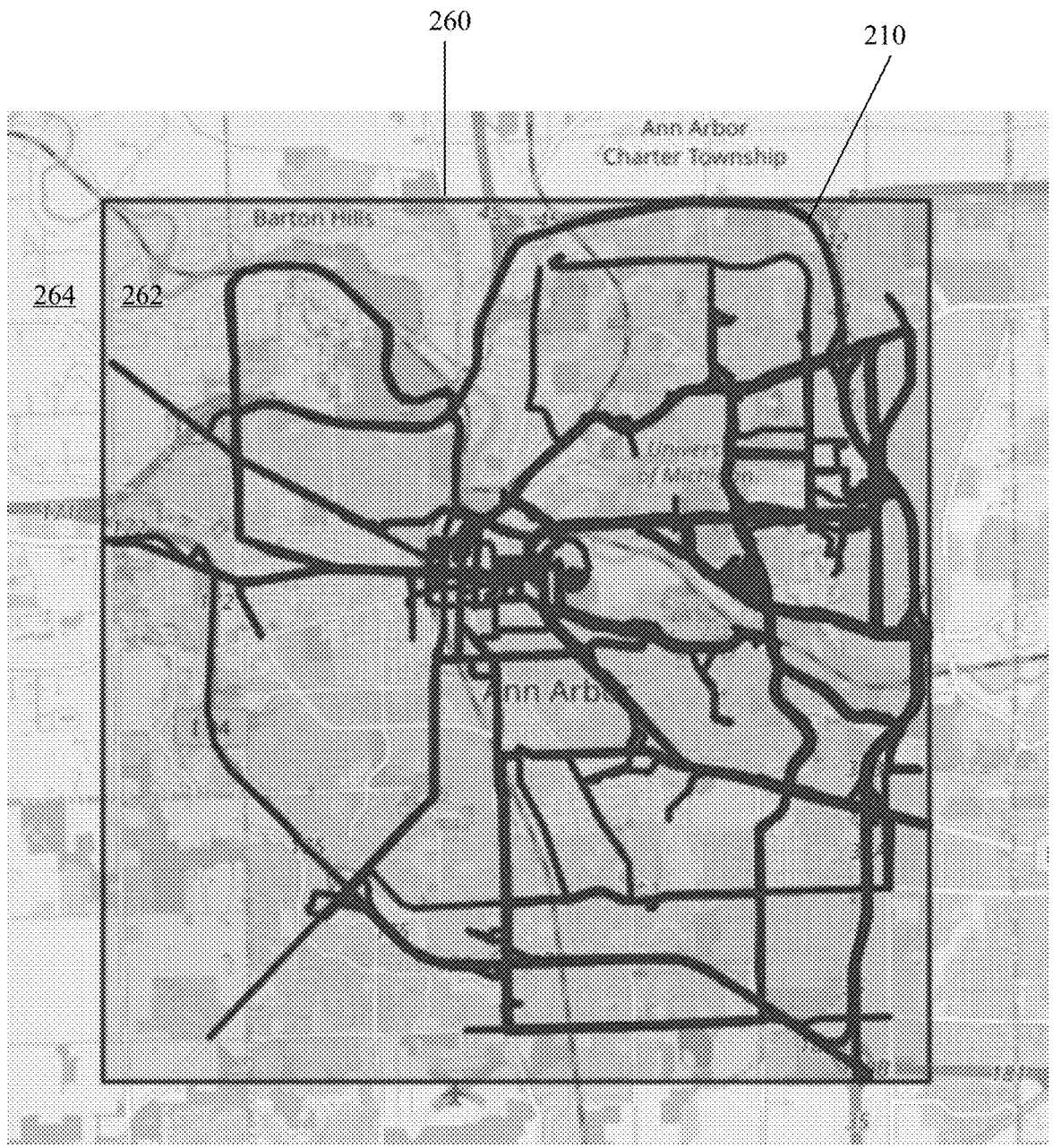
FIG. 11 is a graphical representation of an embodiment of a baseline and a rectangular bounding region generated in accordance with the present disclosure, and overlaid on a map of Ann Arbor, Michigan.
Figure 12:
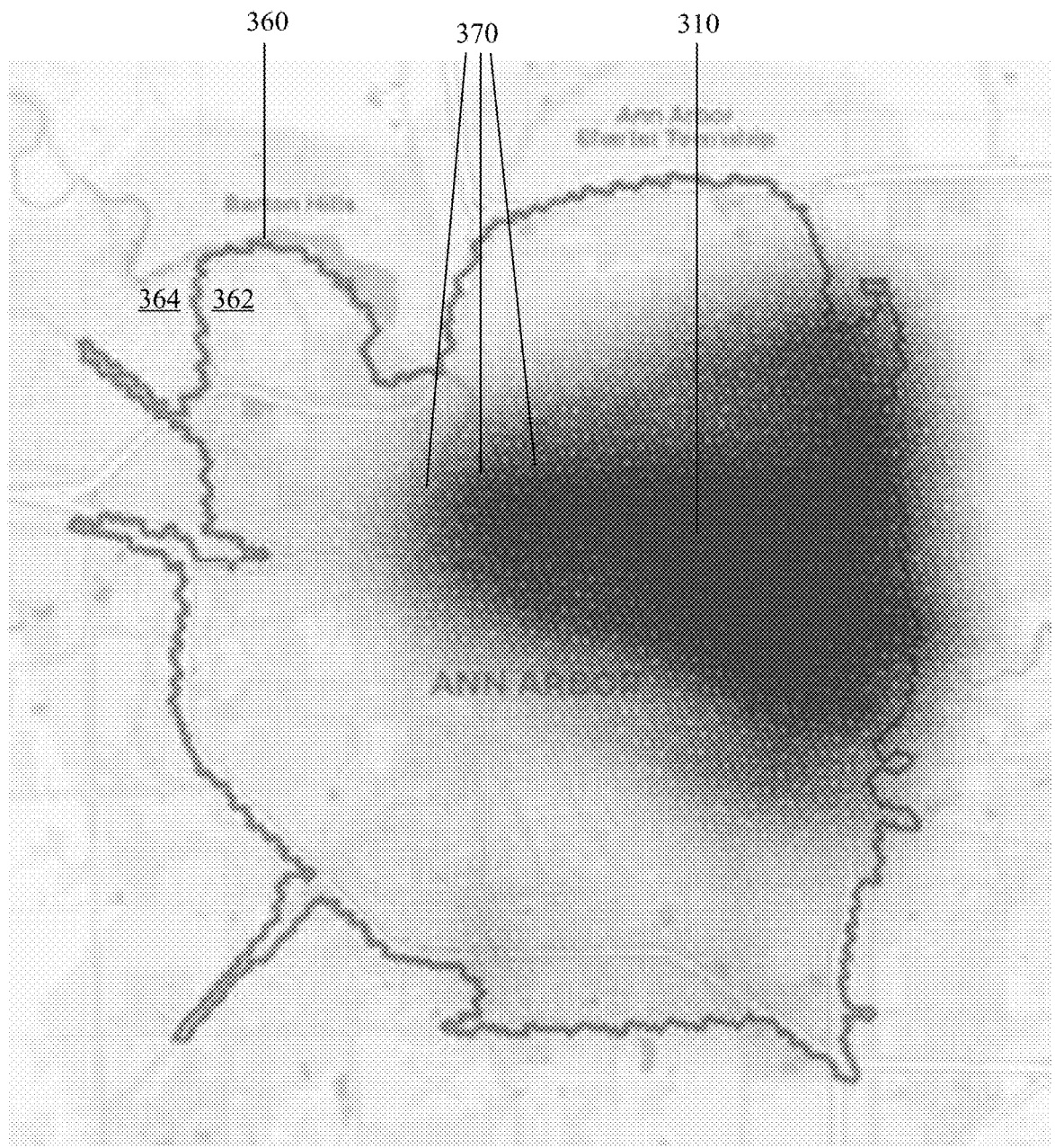
FIG. 12 is a graphical representation of an embodiment of a baseline comprising hexagons and an irregular, circular shaped bounding region generated in accordance with the present disclosure, and overlaid on a map of Ann Arbor, Michigan.

FIGS. 11 and 12 illustrate two different baselines and bounding regions in accordance with the present disclosure, generated based on data collected from two vehicles over the course of a year of driving in-and-around Ann Arbor Mich. The baselines, bounding regions, and any associated metadata may be used in accordance with the disclosure herein to subsequently monitor or otherwise assess a vehicle while in use.

FIG. 11, illustrates an embodiment of a baseline generated in accordance with the present disclosure wherein a baseline 210 comprises known vehicle locations overlaid on a map 200 of Ann Arbor, Michigan, and further bounded by a rectangular bounding region 260. Thus, in addition to the more precise known locations identified by the baseline 210, the bounding region 260 delineates an interior region 262 as 'known' from an exterior region 264 as 'unknown'. In this embodiment, the baseline 210 was generated based on applying a statistical model of traffic density to a year's worth of vehicle location data for two vehicles being driven in-and-around Ann Arbor. In accordance with the present disclosure, the baseline 210 and/or bounding region 260 may be represented in any number of ways. For example, as illustrated in FIG. 12, the baseline 210 resembles lines indicative of different roads traversed by a vehicle while the bounding region 260 is a rectangle that bounds the maximum and minimum geolocation coordinates from the underlying historical vehicle data. The thickness, color, tint, or darkness of a baseline may be generated to represent a characteristic of the underlying historical vehicle data. For example, a particularly thick or dark line in the baseline can indicate that the vehicle traversed that area or portion of the route more frequently than other areas. FIG. 12 illustrates an embodiment of a baseline 310 of known vehicle locations generated based on the same underlying data indicative of historical vehicle and driving routes used for FIG. 11, wherein the baseline 310 rather comprises a plurality of elements 370, namely hexagons, within an irregular circular shaped bounding region 360. Each hexagon 370 represents an area within a geographic region of Ann Arbor that may include, none, one, or a plurality of geolocations associated with the underlying historical data. Characteristics of the hexagon may also be modified to provide an indication of the degree of an underlying behaviour or characteristic of the vehicle associated with the corresponding geolocations encompassed by the hexagon. For example, as particularly visible on the eastern portion of the map 300, the darker shade and density of hexagons 370 provides an indication of an additional characteristic of the known vehicle locations, which in this particular case represents a relative increase in traffic density or vehicle frequency. In other words, the darker shaded portion of the baseline 310 provides an indication of known locations that were more frequently traversed by the vehicle relative to other geolocations represented by the underlying historical vehicle data. Conversely, the lighter shaded and less densely packed hexagons observed on the west side of the baseline 310 provide an indication of known locations that were less frequently traversed by the vehicle relative to other geolocations captured by the underlying historical vehicle data. In an embodiment, the plurality of geolocations represented by the baseline 310 are normalized to a value between 0 and 1 indicative of the traffic density or frequency of traffic for a given geolocation.

In the example illustrated in FIG. 12, the irregular, circular shaped bounding region 360 closely resembles the exterior of baseline 310. In this regard, the bounding region 360 provides an improvement over the rectangular bounding region 260 illustrated in FIG. 11 as the bounding region 360 delineates the 'known' interior 362 from the 'unknown' exterior 364 based on distances from the plurality of hexagons 370, rather than based on minimum and maximum geolocations, as with the rectangular bounding region 260. In this regard, the bounding region 360 more closely resembles the shape of the baseline 310, advantageously providing a more accurate delineation of 'known' and 'unknown' locations relative to the delineation of 'known' and 'unknown' locations provided by the rectangular bounding region 260 illustrated in FIG. 11. Bounding regions may also be based on geographic features such as mountains, buildings, or other landmarks; and/or may be based on road and highway infrastructure, to more organically represent areas where vehicles may be expected (or not expected) to traverse. In an embodiment, interior portions of a bounding region may be identified as 'unknown' locations if their geolocations do not meet certain criteria, such as for example, not being within a minimum distance of a known geolocation or area. In an embodiment, the bounding region dynamically updates based on a current location of the vehicle.

Figure 13:
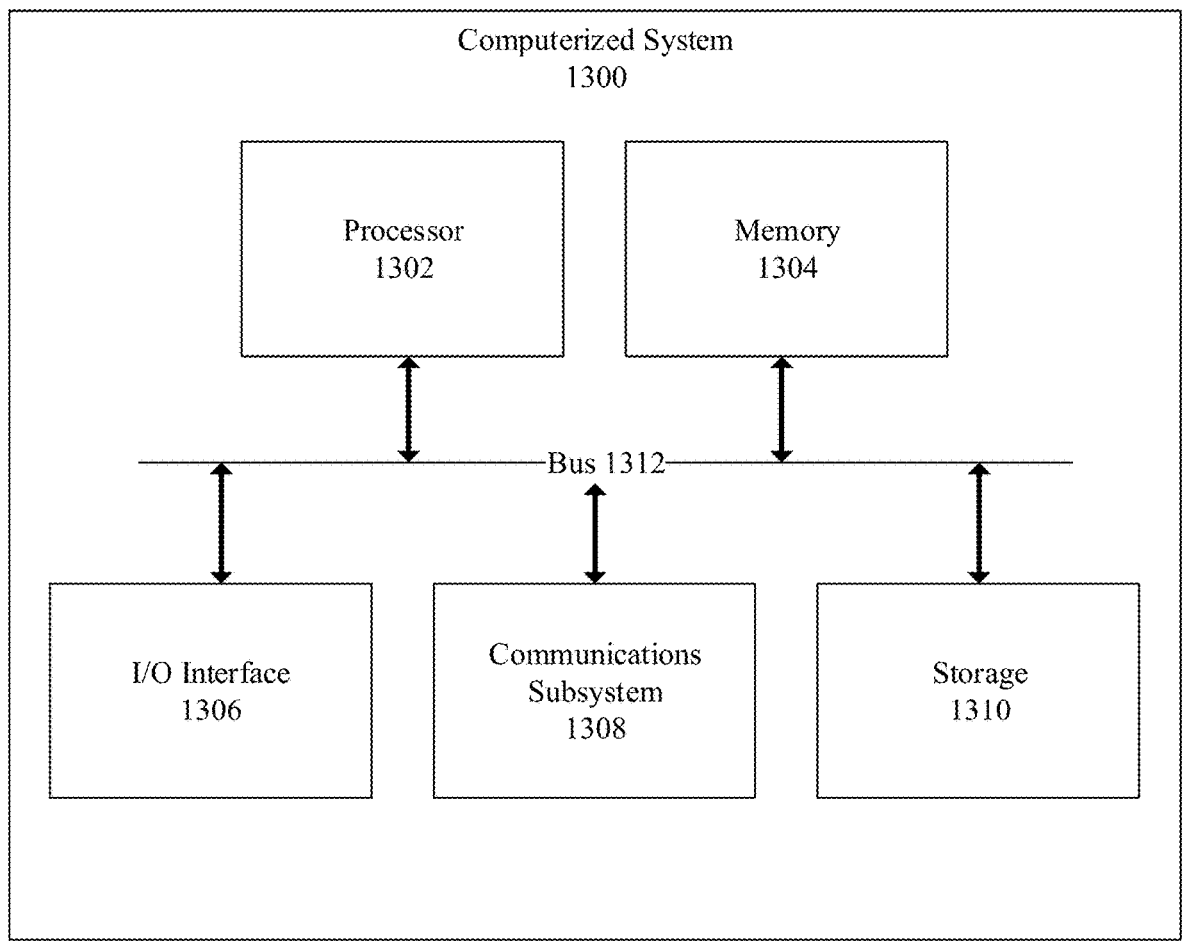
FIG. 13 is a block diagram of an example computing device or system for implementing a vehicle location classification system and method in accordance with the present disclosure.

FIG. 13 is a block diagram of an example computerized device or system 1300 that may be used in implementing one or more aspects or components of an embodiment of an vehicle location classification system and method according to the present disclosure.

Computerized system 1300 may include one or more of a processor 1302, memory 1304, a mass storage device 1310, an input/output (I/O) interface 1306, and a communications subsystem 1308. Further, system 1300 may comprise multiples, for example multiple processors 1302, and/or multiple memories 1304, etc. Processor 1302 may comprise one or more of a digital processor, an analog processor, a digital circuit designed to process information, an analog circuit designed to process information, a state machine, and/or other mechanisms for electronically processing information. These processing units may be physically located within the same device, or the processor 1302 may represent processing functionality of a plurality of devices operating in coordination. The processor 1302 may be configured to execute modules by software; hardware; firmware; some combination of software, hardware, and/or firmware; and/or other mechanisms for configuring processing capabilities on the processor 1302, or to otherwise perform the functionality attributed to the module and may include one or more physical processors during execution of processor readable instructions, the processor readable instructions, circuitry, hardware, storage media, or any other components.

One or more of the components or subsystems of computerized system 1300 may be interconnected by way of one or more buses 1312 or in any other suitable manner.

The bus 1312 may be one or more of any type of several bus architectures including a memory bus, storage bus, memory controller bus, peripheral bus, or the like. The CPU 1302 may comprise any type of electronic data processor. The memory 1304 may comprise any type of system memory such as dynamic random access memory (DRAM), static random access memory (SRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 1310 may comprise any type of storage device configured to store data, programs, and other information and to make the data, programs, and other information accessible via the bus 1312. The mass storage device 1310 may comprise one or more of a solid state drive, hard disk drive, a magnetic disk drive, an optical disk drive, or the like. In some embodiments, data, programs, or other information may be stored remotely, for example in the cloud. Computerized system 1300 may send or receive information to the remote storage in any suitable way, including via communications subsystem 1308 over a network or other data communication medium.

The I/O interface 1306 may provide interfaces for enabling wired and/or wireless communications between computerized system 1300 and one or more other devices or systems. For instance, I/O interface 1306 may be used to communicatively couple with sensors, such as cameras or video cameras. Furthermore, additional or fewer interfaces may be utilized. For example, one or more serial interfaces such as Universal Serial Bus (USB) (not shown) may be provided.

Computerized system 1300 may be used to configure, operate, control, monitor, sense, and/or adjust devices, systems, and/or methods according to the present disclosure.

A communications subsystem 1308 may be provided for one or both of transmitting and receiving signals over any form or medium of digital data communication, including a communication network. Examples of communication networks include a local area network (LAN), a wide area network (WAN), an inter-network such as the Internet, and peer-to-peer networks such as ad hoc peer-to-peer networks. Communications subsystem 1308 may include any component or collection of components for enabling communications over one or more wired and wireless interfaces. These interfaces may include but are not limited to USB, Ethernet (e.g. IEEE 802.3), high-definition multimedia interface (HDMI), Firewire™ (e.g. IEEE 1394), Thunderbolt™, WiFi™ (e.g. IEEE 802.11), WiMAX (e.g. IEEE 802.16), Bluetooth™, or Near-field communications (NFC), as well as GPRS, UMTS, LTE, LTE-A, and dedicated short range communication (DSRC). Communication subsystem 1308 may include one or more ports or other components (not shown) for one or more wired connections. Additionally or alternatively, communication subsystem 1308 may include one or more transmitters, receivers, and/or antenna elements (none of which are shown).

Computerized system 1300 of FIG. 13 is merely an example and is not meant to be limiting. Various embodiments may utilize some or all of the components shown or described. Some embodiments may use other components not shown or described but known to persons skilled in the art.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A computer implemented method for monitoring a current use of a vehicle in real-time based on historical vehicle use, the method comprising:
    acquiring, for the vehicle, historical vehicle data indicative of prior vehicle use, the historical vehicle data including a plurality of geolocations previously traversed by the vehicle;
    generating, using the historical vehicle data, a historical baseline having a subset of geolocations of the plurality of geolocations previously traversed by the vehicle, the subset of geolocations classified as known vehicle locations based on a frequency of traversal by the vehicle over the plurality of geolocations;
    acquiring a current vehicle location and assigning it to a current geolocation of the plurality of geolocations of the historical baseline;
    updating, based on the current geolocation, the frequency of traversal over the plurality of geolocations of the historical baseline;
    determining a distance between the current vehicle location and a known vehicle location of the historical baseline;
    determining, based on the distance between the current vehicle location and a nearest known vehicle location of the historical baseline, whether the current vehicle location is an unknown location;
    in response to determining that the current vehicle location is an unknown vehicle location:
        sending an alert to a remote device, and
        displaying on a display associated with the vehicle routing directions from the current vehicle location to at least one of the known vehicle locations.

2. The computer-implemented method of claim 1, wherein determining, based on the distance between the current vehicle location and the known vehicle location of the historical baseline, whether the current vehicle location is an unknown location comprises comparing the distance the distance between the current vehicle location and the known vehicle location of the historical baseline to a threshold criteria.

3. The computer-implemented method of claim 2, wherein the threshold criteria comprises a maximum distance threshold wherein the current vehicle location is determined to be an unknown location when the distance between the current vehicle location and the known vehicle location of the historical baseline exceeds the maximum distance threshold.

4. The computer-implemented method of claim 1, wherein the historical baseline comprises corresponding vehicle metadata associated with the plurality of geolocations previously traversed by the vehicle.

5. The computer-implemented method of claim 1, wherein the historical baseline comprises a plurality of data elements, each data element associated with a geographic region and being encoded with corresponding geolocations previously traversed by the vehicle.

6. The computer-implemented method of claim 5, wherein each of the plurality of data elements comprises an indication of traffic density based on a proportion of the corresponding geolocations encoded with the data element.

7. The computer-implemented method of claim 5, wherein the geographic region corresponds to a hexagon.

8. The computer-implemented of claim 1, wherein the historical baseline further comprises a bounding region for delineating historical known vehicle locations from historical unknown vehicle locations.

9. The computer-implemented method of claim 1, wherein the routing directions are displayed in response to receiving a selection at the remote device to display the routing directions.

10. A non-transitory computer-readable medium having instructions stored thereon that, when executed by a computing device, cause the computing device to perform a method comprising:
    acquiring, from a navigation system communicatively coupled to the computing device, a current vehicle location for a vehicle;
    determining a distance between the current vehicle location and a known vehicle location of a historical baseline, the historical baseline comprising a subset of geolocations of a plurality of geolocations previously traversed by the vehicle, the subset of geolocations classified as known vehicle locations based on a frequency of traversal by the vehicle over the plurality of geolocations;
    assigning the current vehicle location to a current geolocation of the plurality of geolocations of the historical baseline and updating the frequency of traversal over the plurality of geolocations;
    determining whether the current vehicle location is an unknown location based on the distance between the current vehicle location and the known vehicle locations of the historical baseline;
    in response to determining that the current vehicle location is an unknown vehicle location:
        sending an alert to a remote device, and
        displaying on a display associated with the vehicle routing directions from the current vehicle location to at least one of the known vehicle locations.

11. The non-transitory computer-readable medium of claim 10, wherein the current vehicle location is determined to be an unknown location if the distance between the current vehicle location and the known vehicle locations of the historical baseline exceeds a threshold criteria.

12. The non-transitory computer-readable medium of claim 11, wherein the threshold criteria comprises a maximum distance between the current vehicle location and the known vehicle locations of the historical baseline.

13. The non-transitory computer-readable medium of claim 10, wherein the historical baseline further comprises a bounding region for delineating historical known vehicle locations from historical unknown vehicle locations.

14. The non-transitory computer-readable medium of claim 10, wherein the routing directions are displayed in response to receiving a selection at the remote device to display the routing directions.

15. A system for monitoring a current use of a vehicle based on historical vehicle use, the system comprising:
    a processor communicatively coupled to a navigation system, the navigation system for acquiring a current vehicle location for the vehicle;
    a display communicatively coupled to the processor;
    a memory communicatively coupled to the processor and having stored thereon:
    a historical baseline comprising a subset of geolocations of a plurality of geolocations previously traversed by the vehicle, the subset of geolocations classified as known vehicle locations based on a frequency of traversal by the vehicle over the plurality of geolocations, and
    instructions executable by the processor to cause the processor to:
        assign the current vehicle location to a current geolocation of the plurality of geolocations of the historical baseline;
        update the frequency of traversal over the plurality of geolocations;
        determine whether the current vehicle location is an unknown location based on a distance between the current vehicle location and the known vehicle locations of the historical baseline; and
        in response to determining that the current vehicle location is an unknown location:
            send an alert to a remote device, and
            display on the display routing directions from the current vehicle location to at least one of known vehicle locations.

16. The system of claim 15, wherein the historical baseline comprises a plurality of hexagons, each hexagon corresponding to a geographic region encoded with a subset of geolocations corresponding to the geographic region.

17. The system of claim 15, wherein instructions executable by the processor to cause the processor to display on the display the routing directions from the current vehicle location to at least one of known vehicle locations comprise instructions executable by the processor to cause the processor to display on the display the routing directions in response to receiving a selection at the remote device to display the routing directions.

* * * * *

UNITED STATES PATENT AND TRADEMARK OFFICE
CERTIFICATE OF CORRECTION

PATENT NO. : 12,345,538 B2
APPLICATION NO. : 17/461637
DATED : July 1, 2025
INVENTOR(S) : Sue Hsiu Ying Ludwig and Petar Sic Page 1 of 1

It is certified that error appears in the above-identified patent and that said Letters Patent is hereby corrected as shown below:

In the Claims

Column 15, Line 4, in Claim 2, delete "the distance".

Signed and Sealed this
Sixteenth Day of September, 2025

Coke Morgan Stewart
*Acting Director of the United States Patent and Trademark Office*